US010098035B2

(12) United States Patent
Suzuki et al.

(10) Patent No.: US 10,098,035 B2
(45) Date of Patent: Oct. 9, 2018

(54) TERMINAL DEVICE, BASE STATION DEVICE, INTEGRATED CIRCUIT, AND COMMUNICATION METHOD

(71) Applicant: Sharp Kabushiki Kaisha, Sakai, Osaka (JP)

(72) Inventors: Shoichi Suzuki, Sakai (JP); Tatsushi Aiba, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/546,727

(22) PCT Filed: Jan. 19, 2016

(86) PCT No.: PCT/JP2016/051390
§ 371 (c)(1),
(2) Date: Oct. 6, 2017

(87) PCT Pub. No.: WO2016/125580
PCT Pub. Date: Aug. 11, 2016

(65) Prior Publication Data
US 2018/0027447 A1 Jan. 25, 2018

(30) Foreign Application Priority Data

Feb. 2, 2015 (JP) .................................. 2015-018420

(51) Int. Cl.
H04W 28/04 (2009.01)
H04L 5/00 (2006.01)
(Continued)

(52) U.S. Cl.
CPC ........... *H04W 28/04* (2013.01); *H04L 5/0007* (2013.01); *H04W 72/04* (2013.01); *H04W 72/12* (2013.01)

(58) Field of Classification Search
CPC ..... H04W 28/04; H04W 72/04; H04W 72/12; H04L 5/0007
(Continued)

(56) References Cited

U.S. PATENT DOCUMENTS

2008/0285499 A1* 11/2008 Zhang .................... H04B 7/155
370/315
2009/0186644 A1* 7/2009 Suga ...................... H04L 1/1816
455/500
(Continued)

OTHER PUBLICATIONS

Nokia Corporation et al., "New WI proposal: LTE Carrier Aggregation Enhancement Beyond 5 Carriers", 3GPP TSG RAN Meeting #66, RP-142286, Dec. 8-11, 2014, 9 pages.

Primary Examiner — Cong Tran
(74) Attorney, Agent, or Firm — Keating & Bennett, LLP

(57) ABSTRACT

Provided is a terminal device configured to transmit a HARQ-ACK in a subframe n by using a PUCCH of a special secondary cell, on the basis of detection of PDSCH transmission in a subframe n-k for a special secondary cell. Upon the terminal device having a capability of performing simultaneous transmission and reception in a primary cell and the special secondary cell, the k is given by referring to a second UL/DL configuration. Upon the terminal device not having the capability of performing simultaneous transmission and reception in the primary cell and the special secondary cell, and upon a first UL/DL configuration being different from the second UL/DL configuration, the k is given by referring to the first UL/DL configuration and the second UL/DL configuration.

13 Claims, 13 Drawing Sheets

(51) Int. Cl.
*H04W 72/12* (2009.01)
*H04W 72/04* (2009.01)

(58) Field of Classification Search
USPC ...... 455/452.1, 452.2, 450, 452.3, 522, 561, 455/571
See application file for complete search history.

(56) References Cited

U.S. PATENT DOCUMENTS

| | | | |
|---|---|---|---|
| 2010/0279695 A1* | 11/2010 | Amirijoo | H04W 36/0055 455/438 |
| 2012/0039227 A1* | 2/2012 | Chen | H04L 1/0015 370/311 |
| 2013/0012218 A1* | 1/2013 | Ohta | H04L 1/1887 455/450 |
| 2014/0349712 A1* | 11/2014 | Shukla | H04W 4/22 455/561 |

* cited by examiner

| UL/DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 7

| PLACEHOLDER UL/DL CONFIGURATION | \multicolumn{10}{c}{SUBFRAME NUMBER} |
|---|---|---|---|---|---|---|---|---|---|---|

| PLACEHOLDER UL/DL CONFIGURATION | 0 | 1 | 2 | 3 | 4 | 5 | 6 | 7 | 8 | 9 |
|---|---|---|---|---|---|---|---|---|---|---|
| 0 |  |  | 6 |  | 4 |  |  | 6 |  | 4 |
| 1 |  |  | 7, 6 | 4 |  |  |  | 7, 6 | 4 |  |
| 2 |  |  | 8, 7, 4, 6 |  |  |  |  | 8, 7, 4, 6 |  |  |
| 3 |  |  | 7, 6, 11 | 6, 5 | 5, 4 |  |  |  |  |  |
| 4 |  |  | 12, 8, 7, 11 | 6, 5, 4, 7 |  |  |  |  |  |  |
| 5 |  |  | 13, 12, 9, 8, 7, 5, 4, 11, 6 |  |  |  |  |  |  |  |
| 6 |  |  | 7 | 7 | 5 |  |  | 7 | 7 |  |

FIG. 8

| (UL/DL CONFIGURATION FOR FIRST CELL, UL/DL CONFIGURATION FOR SERVING CELL) | DL REFERENCE UL/DL CONFIGURATION FOR SERVING CELL |
|---|---|
| (0,0) | 0 |
| (0,1) | 1 |
| (0,2) | 2 |
| (0,3) | 3 |
| (0,4) | 4 |
| (0,5) | 5 |
| (0,6) | 6 |
| (1,0) | 1 |
| (1,1) | 1 |
| (1,2) | 2 |
| (1,3) | 4 |
| (1,4) | 4 |
| (1,5) | 5 |
| (1,6) | 1 |
| ⋮ | ⋮ |
| (6,0) | 6 |
| (6,1) | 1 |
| (6,2) | 2 |
| (6,3) | 3 |
| (6,4) | 4 |
| (6,5) | 5 |
| (6,6) | 6 |

FIG. 10

| (UL/DL CONFIGURATION FOR FIRST CELL, UL/DL CONFIGURATION FOR SECOND CELL, UL/DL CONFIGURATION FOR SERVING CELL) | DL REFERENCE UL/DL CONFIGURATION FOR SERVING CELL |
|---|---|
| ⋮ | |
| (3,1,0) | 4 |
| (3,1,1) | 4 |
| (3,1,2) | 5 |
| (3,1,3) | 4 |
| (3,1,4) | 4 |
| (3,1,5) | 5 |
| (3,1,6) | 4 |
| ⋮ | |
| (6,5,0) | 5 |
| (6,5,1) | 5 |
| (6,5,2) | 5 |
| (6,5,3) | 5 |
| (6,5,4) | 5 |
| (6,5,5) | 5 |
| (6,5,6) | 5 |
| (6,6,0) | 6 |
| (6,6,1) | 1 |
| (6,6,2) | 2 |
| (6,6,3) | 3 |
| (6,6,4) | 4 |
| (6,6,5) | 5 |
| (6,6,6) | 6 |

FIG. 11

TERMINAL DEVICE, BASE STATION DEVICE, INTEGRATED CIRCUIT, AND COMMUNICATION METHOD

TECHNICAL FIELD

The present invention relates to a terminal device, a base station device, an integrated circuit, and a communication method.

This application claims priority based on Japanese Patent Application No. 2015-018420 filed on Feb. 2, 2015, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") are being considered. In LTE, a base station device is also referred to as an evolved NodeB (eNodeB), and a terminal device is also referred to as user equipment (UE). LTE is a cellular communication system in which an area is divided into a plurality of cells to form a cellular pattern, each of the cells being served by a base station device. A single base station device may manage a plurality of cells.

LTE supports a time division duplex (TDD). LTE that employs a TDD scheme is also referred to as ID-LTE or LTE TDD. In TDD, an uplink signal and a downlink signal undergo time-division multiplexing. Furthermore. LTE supports a frequency division duplex (FDD).

In the 3GPP, a carrier aggregation has been specified where a terminal device is capable of simultaneously performing transmission and/or reception in up to five serving cells (component carriers).

In the 3GPP, simultaneous transmission and/or reception by a terminal device in over five serving cells (component carriers) has been considered (NPL 1). Furthermore, a terminal device transmitting a physical uplink control channel in a secondary cell that is a serving cell other than a primary cell has also been considered (NPL 1).

CITATION LIST

Non-Patent Literature

NPL 1: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8th-11th December 2014.

DISCLOSURE OF THE INVENTION

Problems to be Solved by the Invention

However, a concrete method for a transmission procedure of a physical uplink control channel in a serving cell other than a primary cell, by a terminal device, has not been sufficiently discussed.

Some aspects of the present invention are contrived in consideration of the above-mentioned points and an object of the present invention is to provide: a terminal device capable of efficiently executing a transmission procedure of a physical uplink control channel in a serving cell other than a primary cell; an integrated circuit mounted in the terminal device; a communication method used in the terminal device; a base station device capable of efficiently executing a reception procedure of a physical uplink control channel in a serving cell other than a primary cell; an integrated circuit mounted in the base station device; and a communication method used in the base station device.

Means for Solving the Problems (1) To accomplish the above-described object, some aspects of the present invention are contrived to provide the following means. That is, a first aspect of the present invention is a terminal device configured to communicate with a base station device by using one primary cell included in a first group and one special secondary cell that is a secondary cell having an uplink component carrier, configured with a physical uplink control channel resource, and included in a second group. The terminal device includes: a reception unit configured to receive first information indicating a first uplink/downlink configuration for the primary cell, and second information indicating a second uplink/downlink configuration for the special secondary cell; and a transmission unit configured to transmit a HARQ-ACK in a subframe m by using a physical uplink control channel of the primary cell, on the basis of detection of transmission of a physical downlink shared channel in a subframe m-j for the primary cell, and configured to transmit a HARQ-ACK in a subframe n by using a physical uplink control channel of the special secondary cell, on the basis of detection of transmission of a physical downlink shared channel in a subframe n-k for the special secondary cell. The j is given by referring to the first uplink/downlink configuration indicated by the first information. Upon the terminal device having a capability of performing simultaneous transmission and reception in the primary cell and the special secondary cell, the k is given by referring to the second uplink/downlink configuration indicated by the second information. Upon the terminal device not having the capability of performing simultaneous transmission and reception in the primary cell and the special secondary cell, and upon the first uplink/downlink configuration indicated by the first information being different from the second uplink/downlink configuration indicated by the second information, the k is given by referring to the first uplink/downlink configuration indicated by the first information and the second uplink/downlink configuration indicated by the second information.

(2) A second aspect of the present invention is an integrated circuit mounted in a terminal device configured to communicate with a base station device by using one primary cell included in a first group and one special secondary cell that is a secondary cell having an uplink component carrier, configured with a physical uplink control channel resource, and included in a second group. The integrated circuit causes the terminal device to fulfill a series of functions of: receiving first information indicating a first uplink/downlink configuration for the primary cell, and second information indicating a second uplink/downlink configuration for the special secondary cell; transmitting a HARQ-ACK in a subframe m by using a physical uplink control channel of the primary cell, on the basis of detection of transmission of a physical downlink shared channel in a subframe m-j for the primary cell; and transmitting a HARQ-ACK in a subframe n by using a physical uplink control channel of the special secondary cell, on the basis of detection of transmission of a physical downlink shared channel in a subframe n-k for the special secondary cell. The j is given by referring to the first uplink/downlink configuration indicated by the first information. Upon the terminal device having a capability of performing simultaneous transmission and reception in the primary cell and the special secondary cell, the k is given by referring to the second uplink/downlink configuration indicated by the second information. Upon the terminal device not having the capability of performing simultaneous transmission and reception in the primary cell and the special secondary cell, and upon the first uplink/downlink configuration indicated by the first information being different from the second uplink/downlink configuration indicated by the second information, the k is given by referring to the first uplink/downlink configuration indicated by the first information and the second uplink/downlink configuration indicated by the second information.

(3) A third aspect of the present invention is a communication method used in a terminal device configured to communicate with a base station device by using one primary cell included in a first group and one special secondary cell that is a secondary cell having an uplink component carrier, configured with a physical uplink control channel resource, and included in a second group. The method includes the steps of: receiving first information indicating a first uplink/downlink configuration for the primary cell, and second information indicating a second uplink downlink configuration for the special secondary cell; transmitting a HARQ-ACK in a subframe m by using a physical uplink control channel of the primary cell, on the basis of detection of transmission of a physical downlink shared channel in a subframe m-j for the primary cell; and transmitting a HARQ-ACK in a subframe n by using a physical uplink control channel of the special secondary cell, on the basis of detection of transmission of a physical downlink shared channel in a subframe n-k for the special secondary cell. The j is given by referring to the first uplink/downlink configuration indicated by the first information. Upon the terminal device having a capability of performing simultaneous transmission and reception in the primary cell and the special secondary cell, the k is given by referring to the second uplink/downlink configuration indicated by the second information. Upon the terminal device not having the capability of performing simultaneous transmission and reception in the primary cell and the special secondary cell, and upon the first uplink/downlink configuration indicated by the first information being different from the second uplink/downlink configuration indicated by the second information, the k is given by referring to the first uplink/downlink configuration indicated by the first information and the second uplink/downlink configuration indicated by the second information.

(4) A fourth aspect of the present invention is a base station device configured to communicate with a terminal device by using one primary cell included in a first group and one special secondary cell that is a secondary cell having an uplink component carrier, configured with a physical uplink control channel resource, and included in a second group. The base station device includes: a transmission unit configured to transmit first information indicating a first uplink/downlink configuration for the primary cell, and second information indicating a second uplink/downlink configuration for the special secondary cell; and a reception unit configured to receive a HARQ-ACK in a subframe m by using a physical uplink control channel of the primary cell, the HARQ-ACK being transmitted on the basis of detection of transmission of a physical downlink shared channel in a subframe for the primary cell, and to receive a HARQ-ACK in a subframe n by using a physical uplink control channel of the special secondary cell, the HARQ-ACK being transmitted on the basis of detection of transmission of a physical downlink shared channel in a subframe n-k for the special secondary cell. The j is given by referring to the first uplink/downlink configuration indicated by the first information. Upon the terminal device having a capability of performing simultaneous transmission and reception in the primary cell and the special secondary cell, the k is given by referring to the second uplink/downlink configuration indicated by the second information. Upon the terminal device not having the capability of performing simultaneous transmission and reception in the primary cell and the special secondary cell, and upon the first uplink/downlink configuration indicated by the first information being different from the second uplink/downlink configuration indicated by the second information, the k is given by referring to the first uplink/downlink configuration indicated by the first information and the second uplink/downlink configuration indicated by the second information.

(5) A fifth aspect of the present invention is an integrated circuit mounted in a base station device configured to communicate with a terminal device by using one primary cell included in a first group and one special secondary cell that is a secondary cell having an uplink component carrier, configured with a physical uplink control channel resource, and included in a second group. The integrated circuit causes the base station device to fulfill a series of functions of: transmitting first information indicating a first uplink/downlink configuration for the primary cell, and second information indicating a second uplink/downlink configuration for the special secondary cell; receiving a HARQ-ACK in a subframe m by using a physical uplink control channel of the primary cell, the HARQ-ACK being transmitted on the basis of detection of transmission of a physical downlink shared channel in a subframe m-j for the primary cell; and receiving a HARQ-ACK in a subframe n by using a physical uplink control channel of the special secondary cell, the HARQ-ACK being transmitted on the basis of detection of transmission of a physical downlink shared channel in a subframe n-k for the special secondary cell. The j is given by referring to the first uplink/downlink configuration indicated by the first information. Upon the terminal device having a capability of performing simultaneous transmission and reception in the primary cell and the special secondary cell, the k is given by referring to the second uplink/downlink configuration indicated by the second information. Upon the terminal device not having the capability of performing simultaneous transmission and reception in the primary cell and the special secondary cell, and upon the first uplink/downlink configuration indicated by the first information being different from the second uplink/downlink configuration indicated by the second information, the k is given by referring to the first uplink/downlink configuration indicated by the first information and the second uplink/downlink configuration indicated by the second information.

(6) A sixth aspect of the present invention is a communication method used in a base station device configured to communicate with a terminal device by using one primary cell included in a first group and one special secondary cell that is a secondary cell having an uplink component carrier, configured with a physical uplink control channel resource, and included in a second group. The method includes the steps of: transmitting first information indicating a first uplink/downlink configuration for the primary cell, and second information indicating a second uplink/downlink configuration for the special secondary cell; receiving a HARQ-ACK in a subframe m by using a physical uplink control channel of the primary cell, the HARQ-ACK being transmitted on the basis of detection of transmission of a physical downlink shared channel in a subframe m-j for the primary cell; and receiving a HARQ-ACK in a subframe n by using a physical uplink control channel of the special secondary cell, the HARQ-ACK being transmitted on the basis of detection of transmission of a physical downlink shared channel in a subframe n-k for the special secondary cell. The j is given by referring to the first uplink/downlink configuration indicated by the first information. Upon the terminal device having a capability of performing simultaneous transmission and reception in the primary cell and the special secondary cell, the k is given by referring to the second uplink/downlink configuration indicated by the second information. Upon the terminal device not having the capability of performing simultaneous transmission and reception in the primary cell and the special secondary cell, and upon the first uplink/downlink configuration indicated by the first information being different from the second uplink/downlink configuration indicated by the second information, the k is given by referring to the first uplink/downlink configuration indicated by the first information and the second uplink downlink configuration indicated by the second information.

Effects of the Invention

According to some aspects of this invention, a terminal device is capable of efficiently executing a transmission procedure of a physical uplink control channel in a serving cell other than a primary cell. Furthermore, a base station device is capable of efficiently executing a reception procedure of a physical uplink control channel in a serving cell other than a primary cell.

BRIEF DESCRIPTION OF THE DRAWINGS

FIG. 7 is a table showing an example of a UL/DL configuration according to the present embodiment.

FIG. 8 is a diagram illustrating an example of a downlink association set K according to the present embodiment.

FIG. 10 is a first diagram illustrating a correspondence between a UL/DL configuration and a DL reference UL/DL configuration according to the present embodiment.

FIG. 11 is a second diagram illustrating a correspondence between a UL/DL configuration and a DL reference UL/DL configuration according to the present embodiment.

MODE FOR CARRYING OUT THE INVENTION

An embodiment of the present invention will be described below.

Figure 1:
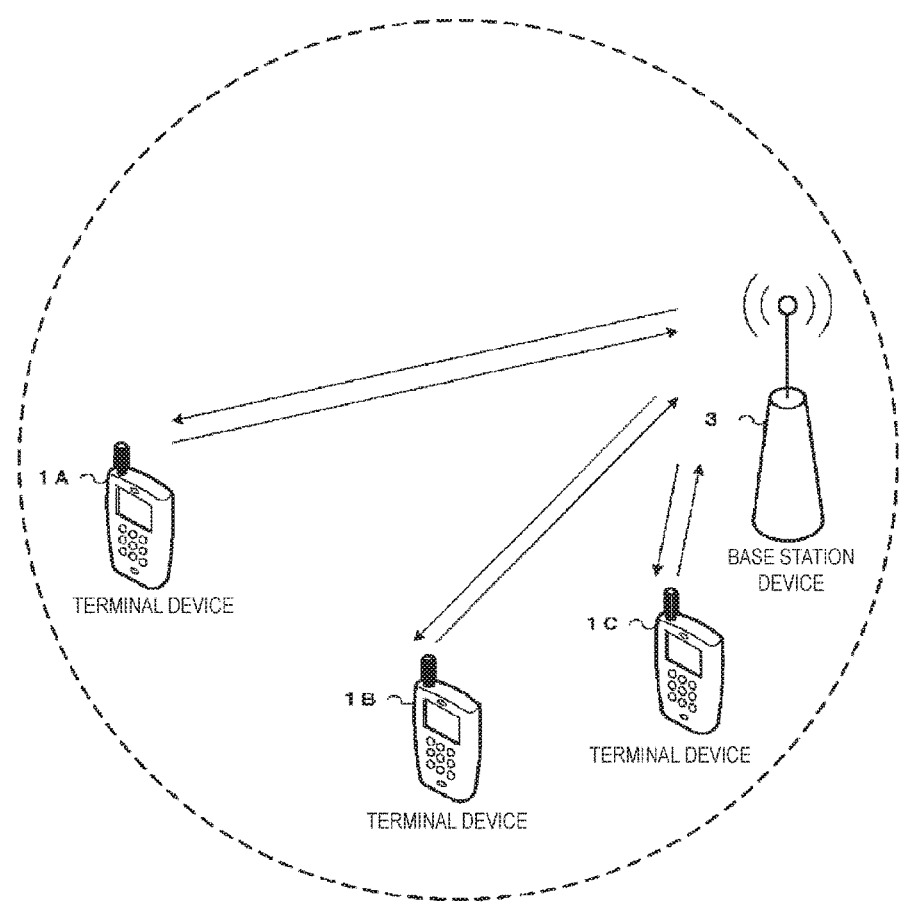
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. Hereinafter, the terminal devices 1A to 1C are each referred to as a terminal device 1.

A carrier aggregation will be described, below.

In the present embodiment, a plurality of serving cells are configured for the terminal device 1. A technology in which the terminal device 1 performs communication via a plurality of serving cells is referred to as cell aggregation, or carrier aggregation. The present invention may be applied to each of the plurality of serving cells configured for the terminal device 1. Furthermore, the present invention may be applied to some of the configured plurality of serving cells. Furthermore, the present invention may be applied to each of the groups of the configured plurality of serving cells. Furthermore, the present invention may be applied to some of the groups of the configured plurality of serving cells.

A time division duplex (TDD) and/or a frequency division duplex (FDD) is applied to the radio communication system according to the present embodiment.

In a case of cell aggregation, the TDD may be applied to all of the plurality of serving cells. Furthermore, in the case of cell aggregation, a serving cell to which the TDD is applied and a serving cell to which the FDD is applied may be aggregated.

The configured plurality of serving cells include one primary cell and one or a plurality of secondary cells. The primary cell is a serving cell in which an initial connection establishment procedure has been performed, a serving cell in which a connection re-establishment procedure has been started, or a cell indicated as a primary cell during a handover procedure. At a point of time when an RRC connection is established, or later, a secondary cell may be configured.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as component carrier.

The terminal device 1 is capable of performing simultaneous transmission and/or reception on a plurality of physical channels in the plurality of serving cells (component carriers). One physical channel is transmitted in one serving cell (component carrier) of the plurality of serving cells (component carriers).

In the present embodiment, a secondary cell used for transmitting a physical uplink control channel (PUCCH) is referred to as a special secondary cell or a PUCCH secondary cell. In the present embodiment, a secondary cell not used for transmitting the PUCCH is referred to as a non-special secondary cell, a non-PUCCH secondary cell, a non-PUCCH serving cell, or a non-PUCCH cell. The primary cell and the special secondary cell are collectively referred to as a PUCCH serving cell or a PUCCH cell.

The PUCCH serving cell (the primary cell, the PUCCH secondary cell) has the downlink component carrier and the uplink component carrier. A PUCCH resource is configured in the PUCCH serving cell (the primary cell, the PUCCH secondary cell).

The non-PUCCH serving cell (the non-PUCCH secondary cell) may have only the downlink component carrier. The non-PUCCH serving cell (the non-PUCCH secondary cell) may have the downlink component carrier and the uplink component carrier.

The terminal device 1 performs transmission on the PUCCH in the PUCCH serving cell. The terminal device 1 performs transmission on the PUCCH in the primary cell. The terminal device 1 performs transmission on the PUCCH in the special secondary cell. The terminal device 1 does not perform transmission on the PUCCH in the non-special secondary cell.

Note that, the special secondary cell may be defined as a serving cell other than the primary cell and the secondary cell.

Physical channels and physical signals according to the present embodiment will be described.

In FIG. 1, the following uplink physical channels are used for uplink radio communication from the terminal device 1 to the base station device 3. The uplink physical channel is used to transmit information output from a higher layer.

Physical uplink control channel (PUCCH)

Physical uplink shared channel (PUCCH)

Physical random access channel (PRACH)

The PUCCH is used to transmit uplink control information (UCI). The pieces of uplink control information include downlink channel state information (CSI), a scheduling request (SR) indicating a request for a PUSCH resource, and a hyblid automatic repeat request acknowledgement (HARQ-ACK) for downlink data (a transport block, a medium access control protocol data unit (MAC PDU), a downlink-shared channel (DL-SCH), a physical downlink shared channel (PUSCH)). The HARQ-ACK indicates an acknowledgement (ACK) or a negative-acknowledgement (NACK). The HARQ-ACK is also referred to as ACK/NACK, HARQ feedback, HARQ-ACK feedback, HARQ response, HARQ-ACK response, HARQ information, HARQ-ACK information, HARQ control information, or HARQ-ACK control information.

The PUSCH is used to transmit uplink data (uplink-shared channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

The PRACH is used to transmit a random access preamble. The PRACH is also used for an initial connection establishment procedure, a handover procedure, a connection re-establishment procedure, synchronization (timing adjustment) for uplink transmission, and a request for the PUSCH resource.

In FIG. 1, the following uplink physical signal is used in the uplink radio communication. The uplink physical signal is not used to transmit information output from a higher layer, but is used by a physical layer.

Uplink reference signal (UL RS)

According to the present embodiment, the following two types of uplink reference signals are used.

Demodulation reference signal (DMRS)

Sounding reference signal (SRS)

The DMRS relates to transmission of the PUSCH or the PUCCH. The DMRS is time-multiplexed with the PUSCH or the PUCCH. The base station device 3 uses the DMRS to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not related to the transmission of the PUSCH or the PUCCH. The base station device 3 uses the SRS to measure an uplink channel state.

In FIG. 1, the following downlink physical channels are used for downlink radio communication from the base station device 3 to the terminal device 1. The downlink physical channel is used to transmit information output from a higher layer.

Physical broadcast channel (PBCH)

Physical control format indicator channel (PCFICH)

Physical hybrid automatic repeat request indicator channel (PHICH)

Physical downlink control channel (PDCCH)

Enhanced physical downlink control channel (EPDCCH)

Physical downlink shared channel (PDSCH)

Physical multicast channel (PMCH)

The PBCH is used to broadcast a master information block (MIB), or a broadcast channel (BCH)) that is shared by the terminal devices 1.

The PCFICH is used to transmit information indicating a region (OFDM symbol) to be used for transmission of the PDCCH.

The PHICH is used to transmit an HARQ indicator (HARQ feedback or response information) indicating an acknowledgement (ACK) or a negative acknowledgement (HACK) with respect to the uplink data (uplink shared channel (UL-SCH)) received by the base station device 3.

The PDCCH and the EPDCCH are used to transmit downlink control information (DCI). The downlink control information is also referred to as a DCI format. The downlink control information includes a DCI format 3. a DCI format 3A, a downlink grant and an uplink grant. The downlink grant is also referred to as downlink assignment or downlink allocation.

The downlink grant is used for scheduling of a single PDSCH within a single cell. The downlink grant is used for the scheduling of the PDSCH within the same subframe as the subframe in which the downlink grant is transmitted.

The uplink grant is used for scheduling of a single PUSCH within a single cell. The uplink grant is used for scheduling of a single PUSCH within the fourth or later subframe after the subframe in which the uplink grant is transmitted. The uplink grant includes a TPC command for the PUSCH.

CRC parity bits attached to the downlink grant or the uplink grant are scrambled with a cell-radio network temporary identifier (C-RNTI) or a semi persistent scheduling cell-radio network temporary identifier (SPS C-RNTI). The C-RNTI and the SPS C-RNTI are identifiers for identifying a terminal device within a cell.

The C-RNTI is used to control the PDSCH or the PUSCH in a single subframe. The SPS C-RNTI is used to periodically allocate a resource for the PDSCH or the PUSCH.

The PDSCH is used to transmit downlink data (downlink shared channel (DL-SCH)).

The PMCH is used to transmit multicast data (multicast channel (MCH)).

In FIG. 1, the following downlink physical signals are used in the downlink radio communication. The downlink physical signal is not used to transmit information output from a higher layer, but is used by the physical layer.

Synchronization signal (SS)

Downlink reference signal (DL RS)

The synchronization signal is used in order for the terminal device 1 to be synchronized in terms of frequency and time domains for the downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the terminal device 1 to perform channel compensation of the downlink physical channel. The downlink reference signal is used in order for the terminal device 1 to calculate the downlink channel state information.

According to the present embodiment, the following five types of downlink reference signals are used.

Cell-specific reference signal (CRS)

UE-specific reference signal (URS) relating to the PDSCH

Demodulation reference signal (DMRS) relating to the EPDCCH

Non-zero power channel state information-reference signal (NIP CSI-RS)

Zero power channel state information-reference signal (ZP CSI-RS)

Multimedia broadcast and multicast service over single frequency network reference signal (MBSFN RS)

Positioning reference signal (PRS)

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in a medium access control (MAC) layer is referred to as a transport channel. The unit of the transport channel used in the MAC layer is referred to as a transport block (TB) or a MAC protocol data unit (PDU). Control of a hybrid automatic repeat request (HARQ) is performed for each transport block in the MAC layer. The transport block is a unit of data that the MAC layer delivers to the physical layer. In the physical layer, the transport block is mapped to a codeword, and coding processing is performed on a codeword-by-codeword basis.

In the present embodiment, a group of a plurality of serving cells is referred to as a PUCCH cell group. A certain serving cell belongs to any one of the PUCCH cell groups.

One PUCCH cell group includes one PUCCH serving cell. One PUCCH cell group may include only one PUCCH serving cell. One PUCCH cell group may include one PUCCH serving cell and one or a plurality of non-PUCCH serving cells.

A PUCCH cell group including the primary cell is referred to as a primary PUCCH cell group. A PUCCH cell group not including the primary cell is referred to as a secondary PUCCH cell group. That is, the secondary PUCCH cell group includes the PUCCH secondary cell.

An index (cell group index) for identifying the PUCCH cell group may be defined. An index for the primary PUCCH cell group is constantly 0. An index for the secondary PUCCH cell group may be configured by the network device (the base station device 3).

The PUCCH of the PUCCH serving cell is used to transmit the uplink control information (HARQ-ACK, and/or CSI) to a serving cell (a PUCCH serving cell, a non-PUCCH serving cell) included in the PUCCH cell group that the PUCCH serving cell belongs to.

That is, the uplink control information (HARQ-ACK, and/or CSI) for the serving cell (the PUCCH serving cell, the non-PUCCH serving cell) included in the PUCCH cell group is transmitted using the PUCCH in the PUCCH serving cell included in the PUCCH cell group.

The present embodiment may only be applied to the HARQ-ACK. The present embodiment may only be applied to the CSI. The present embodiment may be applied to the HARQ-ACK and the CSI. A PUCCH cell group for the HARQ-ACK and a PUCCH cell group for the CSI may be individually defined. The PUCCH cell group for the HARQ-ACK and the PUCCH cell group for the CSI may be common.

A constitution of the radio frame according to the present embodiment will be described below.

Figure 2:
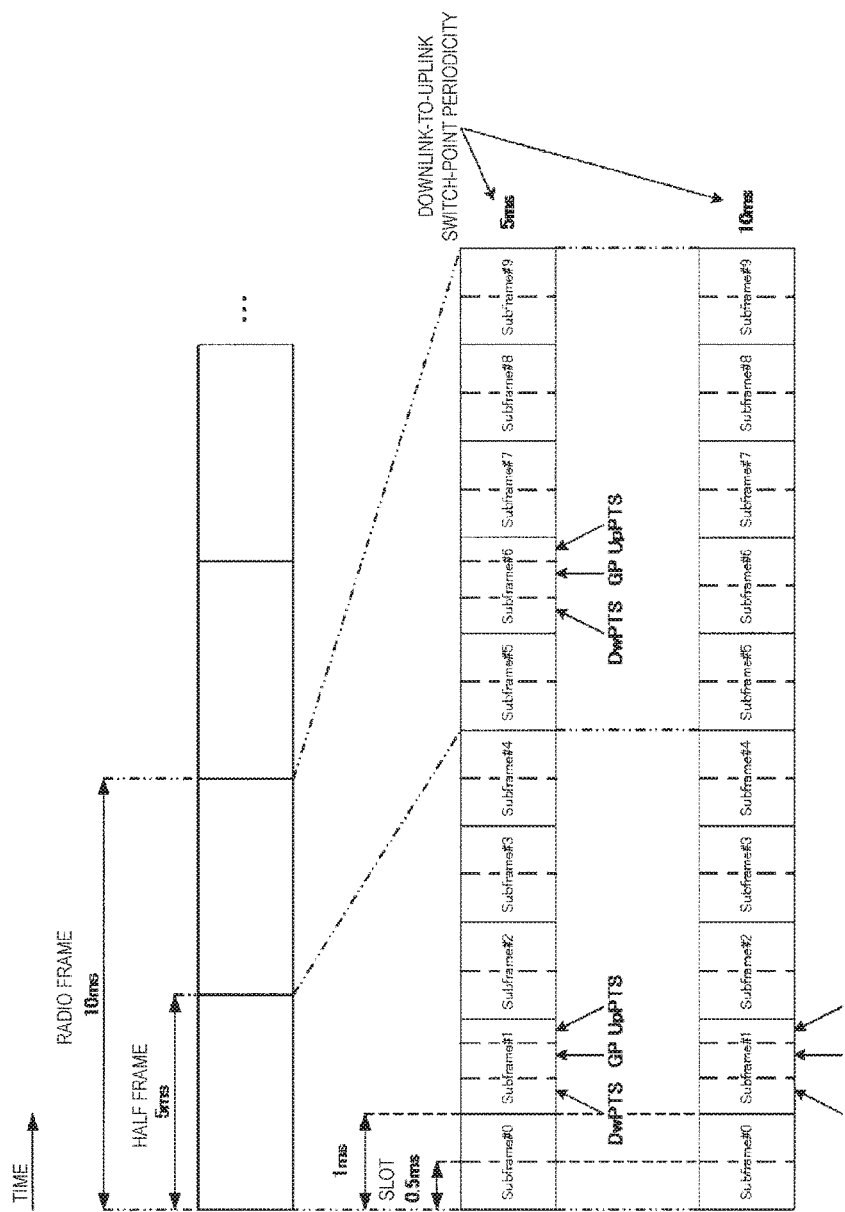
FIG. 2 is a diagram illustrating a schematic constitution of a radio frame according to the present embodiment.

FIG. 2 is a diagram illustrating a schematic constitution of a radio frame according to the present embodiment. Each of the radio frames is 10 ms in length. In FIG. 2, the horizontal axis is a time axis. Furthermore, each of the radio frames is constituted of two half frames. Each of the half frames is 5 ms in length. Each of the half frames is constituted of five subframes. Each of the subframes is 1 ms in length and is defined by two consecutive slots. Each of the slots is 0.5 ms in length. The i-th subframe within a radio frame is constituted of the $(2 \times i)$-th slot and the $(2 \times i+1)$-th slot. To be more precise, 10 subframes can be used at each interval of 10 ms.

According to the present embodiment, the following three types of subframes are defined.

Downlink subframe (first subframe)

Uplink subframe (second subframe)

Special subframe (third subframe)

The downlink subframe is a subframe reserved for downlink transmission. The uplink subframe is a sub-frame reserved for uplink transmission. The special subframe is constituted of three fields. The three fields are a downlink pilot time slot (DwPTS), a guard period (GP), and an uplink pilot time slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Note that, the special subframe may be constituted only of the DwPTS and the GP, or may be constituted only of the GP and the UpPTS.

A single radio frame is constituted of at least the downlink subframe, the uplink subframe, and the special subframe.

A constitution of a slot according to the present embodiment will be described below.

Figure 3:
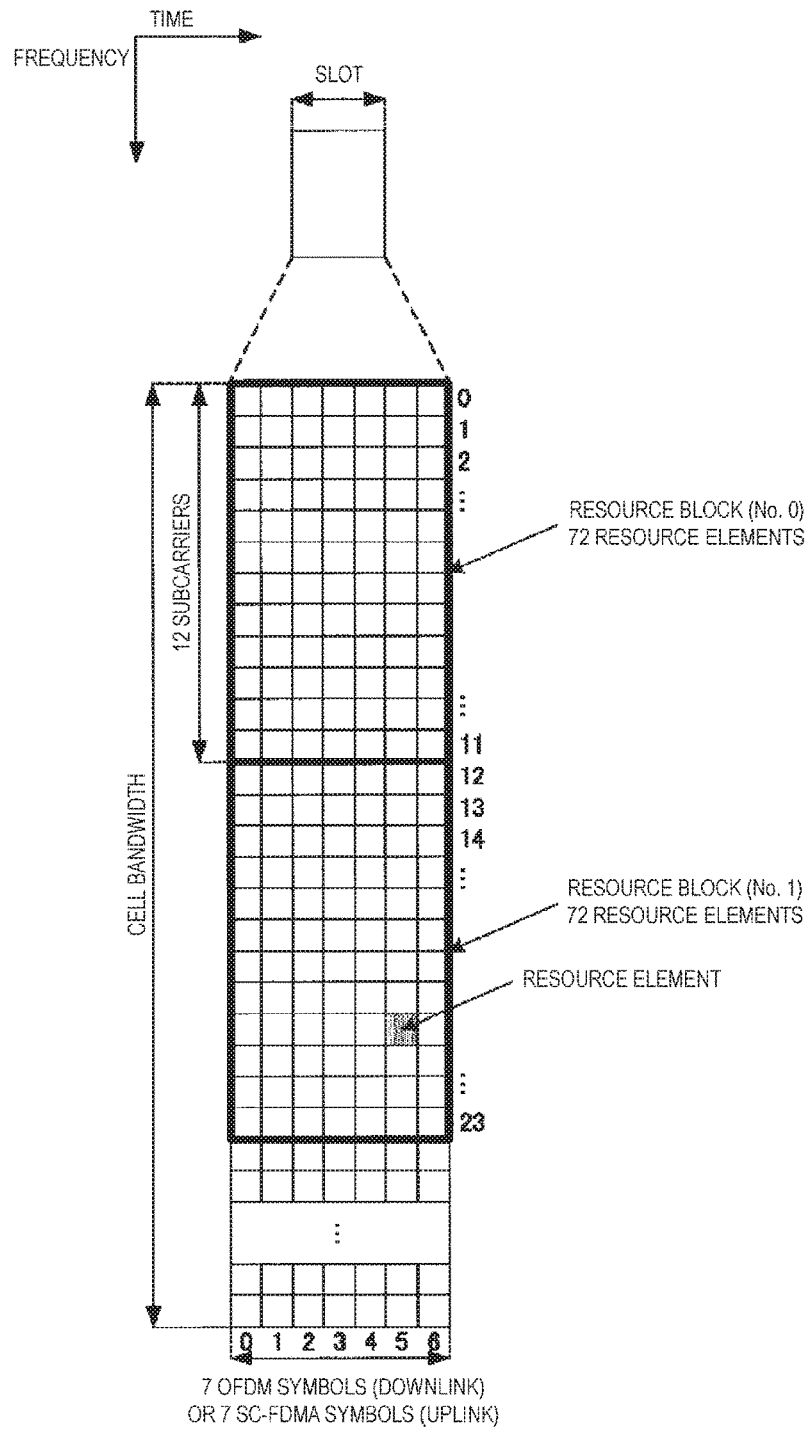
FIG. 3 is a diagram illustrating a constitution of a slot according to the present embodiment.

FIG. 3 is a diagram illustrating a constitution of a slot according to the present embodiment. According to the present embodiment, a normal cyclic prefix (CP) is applied to the OFDM symbol. Moreover, an extended cyclic prefix (CP) may be applied to the OFDM symbol. A physical signal or a physical channel transmitted in each of the slots is expressed by a resource grid. In FIG. 3, the horizontal axis is a time axis, and the vertical axis is a frequency axis. In the downlink, the resource grid is defined by a plurality of subcarriers and a plurality of OFDM symbols. In the uplink, the resource grid is defined by a plurality of subcarriers and a plurality of SC-FDMA symbols. The number of subcarriers constituting one slot depends on a cell bandwidth. The number of OFDM symbols or SC-FDMA symbols constituting one slot is seven. Each element within the resource grid is referred to as a resource element. The resource element is identified by a subcarrier number, and an OFDM symbol or SC-FDMA symbol number.

A resource block is used to express mapping of a certain physical channel (the PDSCH, the PUSCH, or the like) to resource elements. The resource block is defined by a virtual resource block and a physical resource block. A certain physical channel is first mapped to the virtual resource block. Thereafter, the virtual resource block is mapped to the physical resource block. One physical resource block is defined by seven consecutive OFDM symbols or SC-FDMA symbols in the time domain and by 12 consecutive subcarriers in the frequency domain. Therefore, one physical resource block is constituted of (7×12) resource elements. Furthermore, one physical resource block corresponds to one slot in the time domain and corresponds to 180 kHz in the frequency domain. The physical resource blocks are numbered from 0 in the frequency domain.

The physical channel and the physical signal that are transmitted in each of the subframes will be described below.

Figure 4:
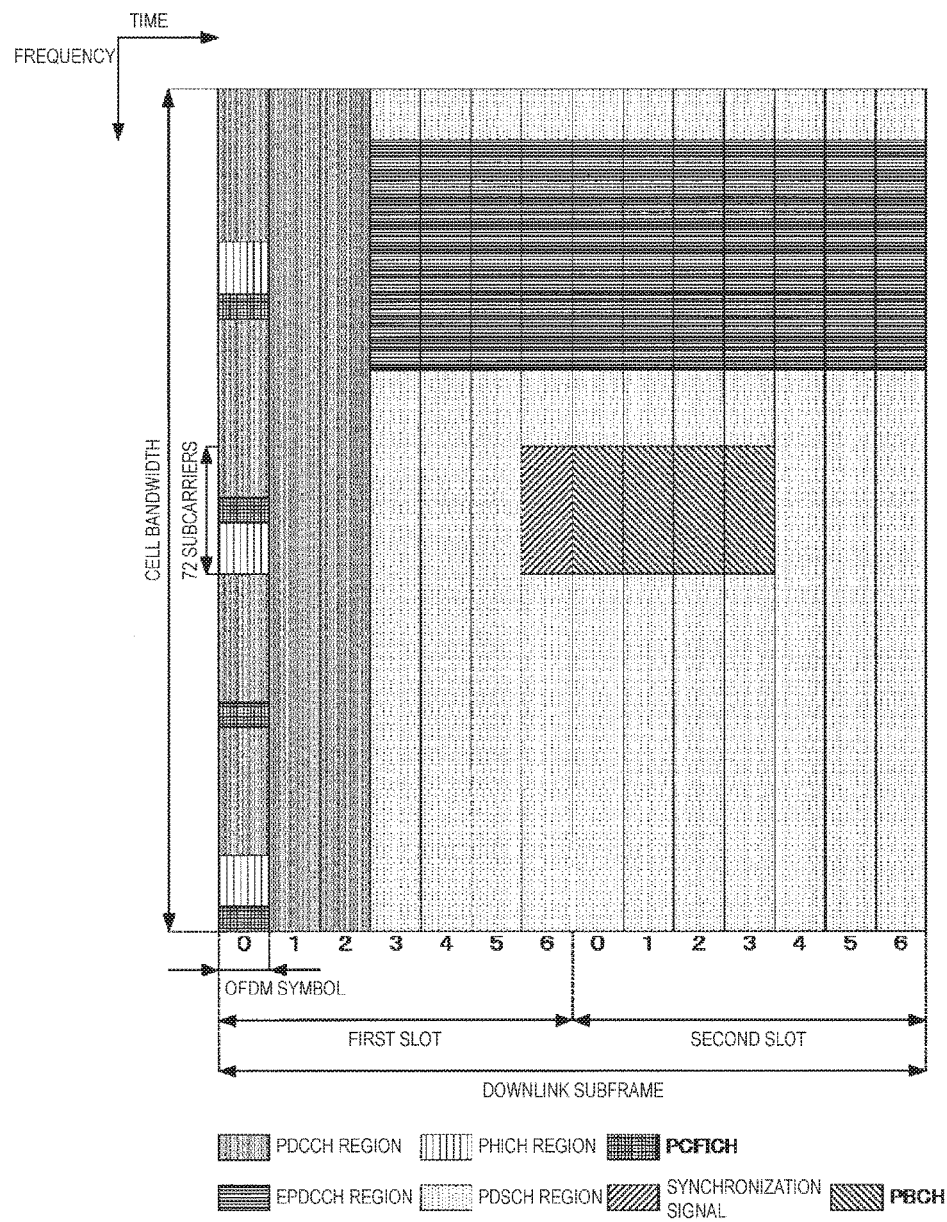
FIG. 4 is a diagram illustrating an example of allocation of a physical channel and mapping of a physical signal to a downlink subframe according to the present embodiment.

FIG. 4 is a diagram illustrating one example of allocation of a physical channel and mapping of a physical signal to a downlink subframe according to the present embodiment. In FIG. 4, the horizontal axis is a time axis, and the vertical axis is a frequency axis. The base station device 3 may transmit the downlink physical channel (the PBCH, the PCFICH, the PHICH, the PDCCH, the EPDCCH, or the PDSCH), and the downlink physical signal (the synchronization signal or the downlink reference signal) in the downlink subframe. Note that, the PBCH is transmitted only in a subframe 0 within the radio frame. Moreover, the downlink reference signal is mapped to the resource elements distributed in the frequency domain and the time domain. The downlink reference signal is not illustrated in FIG. 4 for the sake of simplicity.

A plurality of PDCCHs may be frequency-multiplexed and time-multiplexed in a PDCCH region. A plurality of EPDCCHs may be frequency-multiplexed, time-multiplexed, and spatial-multiplexed in an EPDCCH region. A plurality of PDSCHs may be frequency-multiplexed and spatial-multiplexed in a PDSCH region. The PDCCH and, the PDSCH or the EPDCCH may be time-multiplexed. The PDSCH and the EPDCCH may be frequency-multiplexed.

Figure 5:
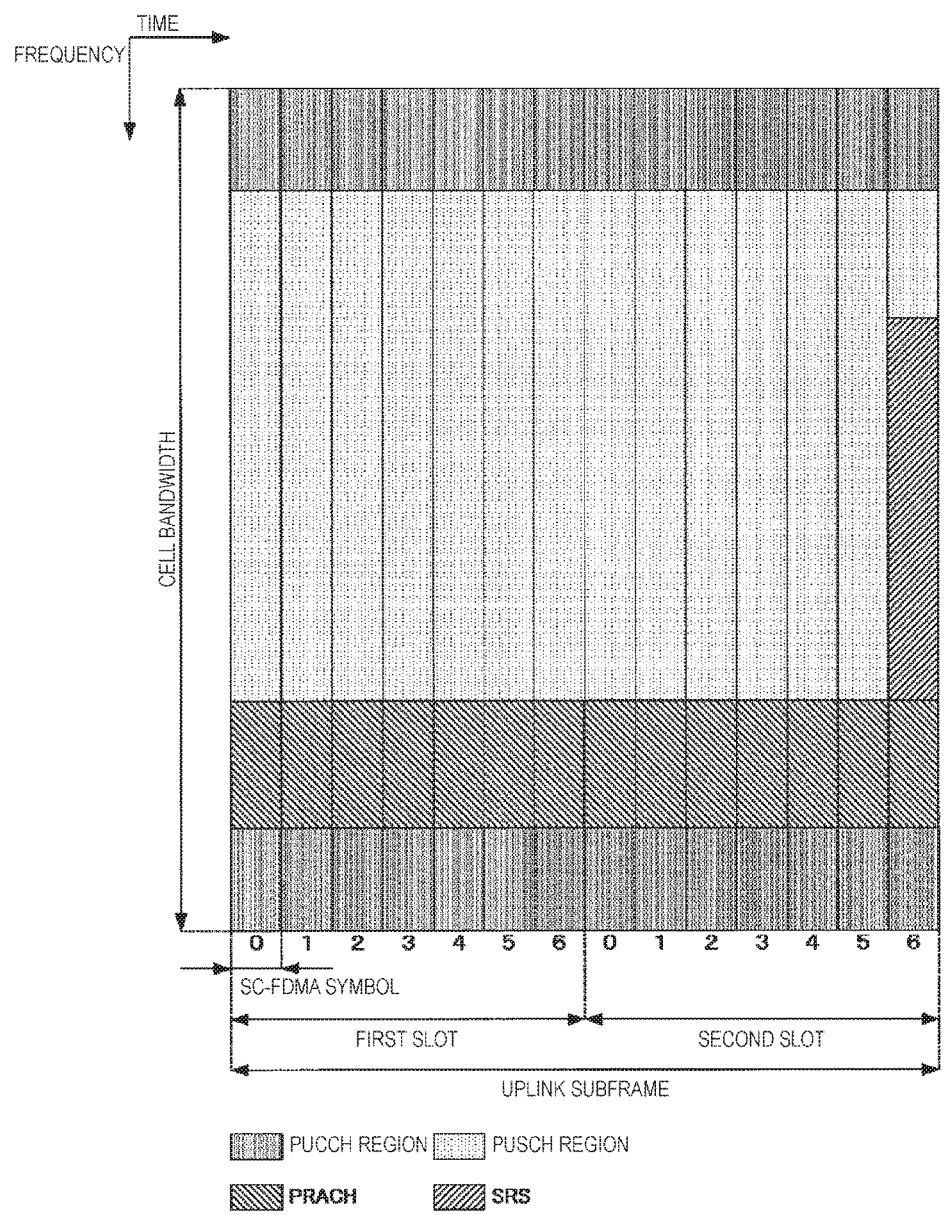
FIG. 5 is a diagram illustrating an example of allocation of a physical channel and mapping of a physical signal to an uplink subframe according to the present embodiment.

FIG. 5 is a diagram illustrating one example of allocation of a physical channel and mapping of a physical signal to an uplink subframe according to the present embodiment. In FIG. 5, the horizontal axis is a time axis, and the vertical axis is a frequency axis. The terminal device 1 may transmit the uplink physical channel (the PUCCH, the PUSCH or the PRACH) and the uplink physical signal (the DMRS or the SRS) in the uplink subframe. A plurality of PUCCHs are frequency-multiplexed, time-multiplexed, and code-multiplexed in a PUCCH region. A plurality of PUSCHs may be frequency-multiplexed and spatial-multiplexed in a PUSCH region. The PUCCH and the PUSCH may be frequency-multiplexed. The PRACH may be allocated over a single subframe or two subframes. Furthermore, a plurality of PRACHs may be code-multiplexed.

The SRS is transmitted using the last SC-FDMA symbol within the uplink subframe. To be more precise, the SRS is mapped to the last SC-FDMA symbol within the uplink subframe. The terminal device 1 cannot transmit the SRS and the PUCCH/PUSCH/PRACH at the same time in a single SC-FDMA symbol in a single cell. In a single uplink subframe in a single cell, the terminal device 1 is capable of transmitting the PUSCH and/or the PUCCH using an SC-FDMA symbol except the last SC-FDMA symbol within the uplink subframe, and is capable of transmitting the SRS using the last SC-FDMA symbol within the uplink subframe. To be more precise, in the single uplink subframe in the single cell, the terminal device 1 can transmit both of the SRS and the PUSCH/PUCCH. Note that, the DMRS is time-multiplexed with the PUCCH or the PUSCH. The DMRS is not illustrated in FIG. 5 for the sake of simplicity.

Figure 6:
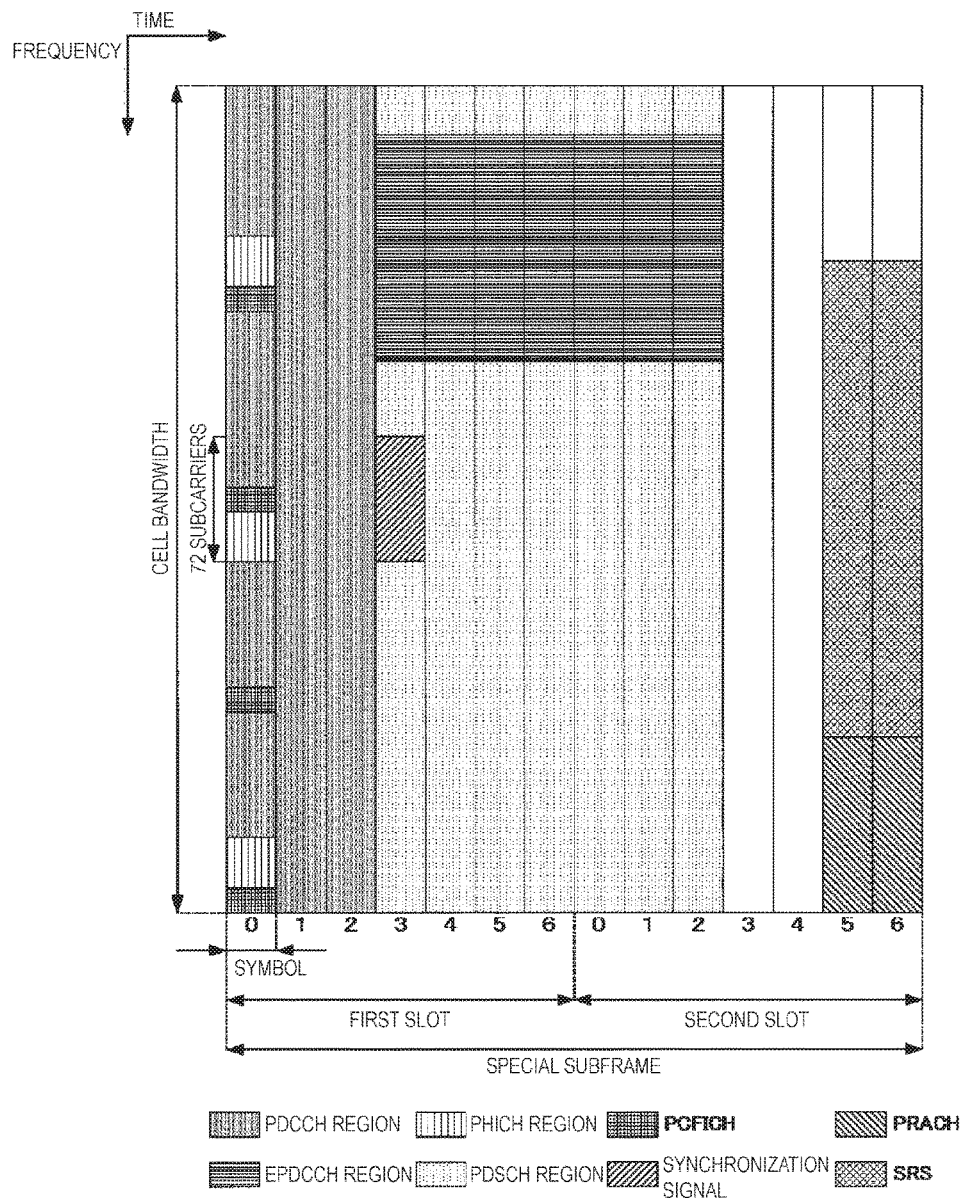
FIG. 6 is a diagram illustrating an example of allocation of a physical channel and mapping of a physical signal to a special subframe according to the present embodiment.

FIG. 6 is a diagram illustrating one example of allocation of a physical channel and mapping of a physical signal to a special subframe according to the present embodiment. In FIG. 6, the horizontal axis is a time axis, and the vertical axis is a frequency axis. In FIG. 6, the DwPTS is constituted of the first to 10-th SC-FDMA symbols within the special subframe, the GP is constituted of the 11-th and 12-th SC-FDMA symbols within the special subframe, and the UpPTS is constituted of the 13-th and 14-th SC-FDMA symbols within the special subframe.

The base station device 3 may transmit the PCFICH, the PHICH, the PDCCH, the EPDCCH, the PUSCH, the synchronization signal, and the downlink reference signal, in the DwPTS of the special subframe. The base station device 3 does not transmit the PBCH in the DwPTS of the special subframe. The terminal device 1 may transmit the PRACH and the SRS in the UpPTS of the special subframe. To be more precise, the terminal device 1 transmits none of the PUSCH, the PUSCH, and the DMRS in the UpPTS of the special subframe.

A transmission direction uplink/downlink configuration (UL/DL configuration) be described below.

The UL/DL configuration is a configuration relating to the pattern of a subframe within the radio frame. The UL/DL configuration indicates which subframe among the downlink subframe, the uplink subframe, and the special subframe, each of the subframes within the radio frame corresponds to. To be more precise, the UL/DL configuration is defined by the pattern of the downlink subframe, the uplink subframe, and the special subframe within the radio frame.

The pattern of the downlink subframe, the uplink subframe, and the special subframe indicates which subframe among the downlink subframe, the uplink subframe, and the special subframe, each of subframes #0 to #9 corresponds to, and is desirably expressed by any combination of D, U, and S (which denote the downlink subframe, the uplink subframe, and the special subframe, respectively) in a length of D, U, and S being 10. More desirably, the first subframe (to be more precise, subframe #0) is D, and the second subframe (to be more precise, subframe #1) is S.

FIG. 7 is a table showing one example of a UL/DL configuration according to the present embodiment. In FIG. 7, D denotes a downlink subframe, U denotes an uplink subframe, and S denotes a special subframe. Setting of i as the UL/DL configuration is referred to as setting of UL/DL configuration i.

A method of setting the UL/DL configuration will be described below.

The base station device 3 sets the UL/DL configuration to each of the serving cells. That is, the UL/DL configuration is defined for each of the plurality of serving cells. The base station device 3 may transmit x-th information indicating the UL/DL configuration for the serving cell in at least one of: a system information block type 1 message, a system information message, an RRC message, a MAC control element (CE), and physical layer control information (for example, a DCI format). Furthermore, depending on the circumstances, the base station device 3 may include the x-th information indicating the UL/DL configuration for the serving cell in one of: the MIB, the system information block type 1 message, the system information message, the RRC message, the MAC CE, and the physical layer control information (for example, the DCI format).

The base station device 3 transmits, to the terminal device 1 for which a plurality of serving cells are configured, the x-th information for each of the plurality of serving cells. Note that, the x-th information may be defined individually for each of the serving cells.

The x-th information for the primary cell is also referred to as first information. The x-th information for the special secondary cell is also referred to as second information. The x-th information for the non-special secondary cell is also referred to as third information. The information may also correspond to a serving cell having a serving cell index x.

The terminal device 1 for which a plurality of serving cells are configured may set the UL/DL configuration for each of the serving cells, on the basis of the information indicating the UL/DL configuration.

A HARQ-ACK transmission timing in the uplink will be described below.

The terminal device 1 transmits a HARQ-ACK in an uplink subframe n, on the basis of detection of a PDSCH transmission in a subframe n-k in a certain serving cell. Here, the PDSCH is intended for the terminal device 1. Furthermore, the PDSCH is a PDSCH for which the HARQ-ACK shall be provided. Further, the k is included in a downlink association set K.

FIG. 8 is a diagram illustrating an example of a downlink association set K according to the present embodiment. If a placeholder UL/DL configuration is 1 and a subframe number of subframe n is 2 in FIG. 8, the downlink association set K includes $\{k_0=7, k_1=6\}$. That is, if the placeholder UL/DL configuration is 1, and the subframe number of subframe n is 2 in FIG. 8, the terminal device 1 transmits the HARQ-ACK in the uplink subframe n, on the basis of detection of a PDSCH transmission in a subframe n−7 and/or a PDSCH transmission in a subframe n−6.

The placeholder UL/DL configuration in FIG. 8 refers to a UL/DL configuration indicated by the x-th information, or to a downlink reference uplink-downlink configuration (DL reference UL/DL configuration). That is, the UL/DL configuration indicated by the x-th information and the DL reference UL/DL configuration are used to specify (select or determine) the correspondence between the subframe n-k in which the PDSCH is allocated and the subframe n used to transmit the HARQ-ACK corresponding to the detection of the PDSCH. The DL reference UL/DL configuration for the HARQ-ACK transmission timing in the uplink is defined for each serving cell.

Which of the UL/DL configuration indicated by the x-th information, or the DL reference UL/DL configuration, the placeholder UL/DL configuration refers to, may be specified (selected or determined) on the basis of some or all of following condition (1) to condition (12). Which of the UL/DL configuration indicated by the x-th information, or the DL reference UL/DL configuration, the placeholder UL/DL configuration refers to, may be specified (selected or determined) for each of the PUCCH cell groups.

Condition (1): whether or not the UL/DL configuration is the same for all serving cells Condition (2): whether or not at least two of the UL/DL configurations of the UL/DL configurations for the serving cells are different Condition (3): whether or not the UL/DL configuration for the primary cell is the same as the UL/DL configuration for the secondary cell (the PUCCH secondary cell and/or the non-PUCCH secondary cell)

Condition (4): whether or not the UL/DL configuration for the primary cell included in the primary PUCCH cell group is the same as the UL/DL configuration for the PUCCH secondary cell included in the secondary PUCCH cell group Condition (5): whether or not the UL/DL configuration is the same for all serving cells included in one PUCCH cell group Condition (6): whether or not at least two of the UL/DL configurations for the serving cells included in one PUCCH cell group are different Condition (7): whether or not the UL/DL configuration for a PUCCH serving cell included in one PUCCH cell group is the same as the UL/DL configuration for a non-PUCCH serving cell included in the one PUCCH cell group Condition (8): whether or not an enhanced interference mitigation and traffic adaptation (eIMTA) is configured for any of the serving cells Condition (9): whether or not the terminal device 1 supports simultaneous reception and transmission for inter-band TDD carrier aggregation Condition (10): whether the serving cell is a primary cell or a secondary cell Condition (11): whether the serving cell is a PUCCH serving cell or a non-PUCCH serving cell Condition (12): whether the serving cell is included in a primary PUCCH cell group or a secondary PUCCH cell group Inter-band TDD carrier aggregation is carrier aggregation to which a plurality of serving cells belonging to different bands and to which TDD is applied, are aggregated. Whether or not the terminal device 1 supports simultaneous transmission and reception for inter-band TDD carrier aggregation, depends on a combination of bands to which the aggregated serving cells belong.

That is, without supporting simultaneous transmission and reception for inter-band TDD carrier aggregation for a first combination of bands, the terminal device 1 may support simultaneous transmission and reception for inter-band TDD carrier aggregation for a second combination of bands. That is, whether or not the terminal device 1 satisfies condition (12) depends on a combination of bands to which the aggregated plurality of serving cells belong. That is, the HARQ-ACK transmission timing in the uplink may be based on the combination of bands to which the aggregated plurality of serving cells belong.

The fact that the terminal device 1 supports simultaneous transmission and reception for inter-band TDD carrier aggregation, means that the terminal device 1 has the capability for simultaneous transmission and reception in the aggregated plurality of serving cells. The fact that the terminal device 1 does not support simultaneous transmission and reception for inter-band TDD carrier aggregation, means that the terminal device 1 has no capability for simultaneous transmission and reception in the aggregated plurality of serving cells.

The terminal device 1 may transmit, to the base station device 3, capability information indicating whether or not the terminal device 1 supports simultaneous transmission and reception for inter-band TDD carrier aggregation. The capability information may be defined for each combination of bands.

The capability formation may indicate whether or not the terminal device 1 supports simultaneous transmission of a plurality of PUCCHs. If the terminal device 1 supports simultaneous transmission of a plurality of PUCCHs, the terminal device 1 can perform simultaneous transmission of a plurality of PUCCHs in a plurality of PUCCH serving cells.

If a plurality of serving cells accompanying different UL/DL configurations are aggregated in the current radio frame, and the terminal device 1 has no capability for simultaneous transmission and reception in the aggregated plurality of serving cells, the following constraints are applied.

Constraint (1): upon a subframe in the primary cell being a downlink subframe, the terminal device 1 shall not transmit any signal or channel in the secondary cell in the same sub-frame Constraint (2): upon a subframe in the primary cell being an uplink subframe, the terminal device 1 is not expected to receive any downlink transmission in the secondary cell in the same subframe Constraint (3): upon a subframe in the primary cell being a special subframe and the same subframe in the secondary cell being a downlink subframe, the terminal device 1 is not expected to receive the transmitted PDSCH/EPDCCH/PMCH/PRS in the secondary cell in the same sub-frame, and the terminal device 1 is not expected to receive any signal in a secondary cell in the OFDM symbol overlapping with the GP/UpPTS in the primary cell That is, upon a plurality of serving cells accompanying different UL/DL configurations being aggregated in the current radio frame, and the terminal device 1 having no capability for simultaneous transmission and reception in the aggregated plurality of serving cells, if a subframe in the primary cell is a downlink subframe, the terminal device 1 shall not transmit uplink control information using the PUCCH in the PUCCH secondary cell in the same subframe.

Upon a plurality of serving cells accompanying different UL/DL configurations being aggregated in the current radio frame, and the terminal device 1 having no capability for simultaneous transmission and reception in the aggregated plurality of serving cells, the HARQ-ACK transmission timing in the uplink to a serving cell included in the secondary PUCCH cell group is preferably specified (selected or determined) such that the subframe in the primary cell avoids a downlink subframe.

For example, upon the eIMTA being not configured for any of the serving cells for the terminal device 1, and more than one serving cells being configured for the terminal device 1, and the UL/DL configuration for all serving cells being the same, the placeholder UL/DL configuration may refer to the UL/DL configuration indicated by the x-th information.

That is, upon the eIMTA being not configured for any of the serving cells for the terminal device 1, and more than one serving cells are configured for the terminal device 1, and the UL/DL configuration for all serving cells being the same, the UL/DL configuration for a certain serving cell may be used in order to specify (select or determine) the correspondence between the subframe n-k in which the PDSCH for a certain serving cell is allocated and the subframe n used to transmit the HARQ-ACK corresponding to the detection of the PDSCH.

For example, upon more than one serving cells being configured for the terminal device 1, and at least two serving cells having different UL/DL configurations, the placeholder UL/DL configuration may refer to the DL reference UL/DL configuration.

That is, upon more than one serving cells being configured for the terminal device 1, and at least two serving cells having different UL/DL configurations, the DL reference UL/DL configuration for a certain serving cell may be used in order to specify (select or determine) the correspondence between the subframe n-k in which the PDSCH for a certain serving cell is allocated and the subframe n used to transmit the HARQ-ACK corresponding to the detection of the PDSCH.

A process used to specify (select or determine) the reference UL/DL configuration will be described below.

The process used to specify (select or determine) the DL reference UL/DL configuration may be changed by referring to some or all of the above-mentioned condition (1) to condition (12). The DL reference UL/DL configuration is given by referring to one or a plurality of UL/DL configurations of the UL/DL configurations for all the serving cells. Which UL/DL configuration of the UL/DL configurations for all the serving cells is used for reference to specify (select or determine) the DL reference UL/DL configuration, may be decided on the basis of some or all of the condition (1) to condition (12). That is, which of the UL/DL configurations for the serving cell is used for specifying (selecting or determining) the correspondence between the subframe n-k in which the PDSCH for a certain serving cell is allocated and the subframe n used to transmit the HARQ-ACK corresponding to the detection of the PDSCH, may be decided on the basis of some or all of the condition (1) to condition (12).

Figure 9:
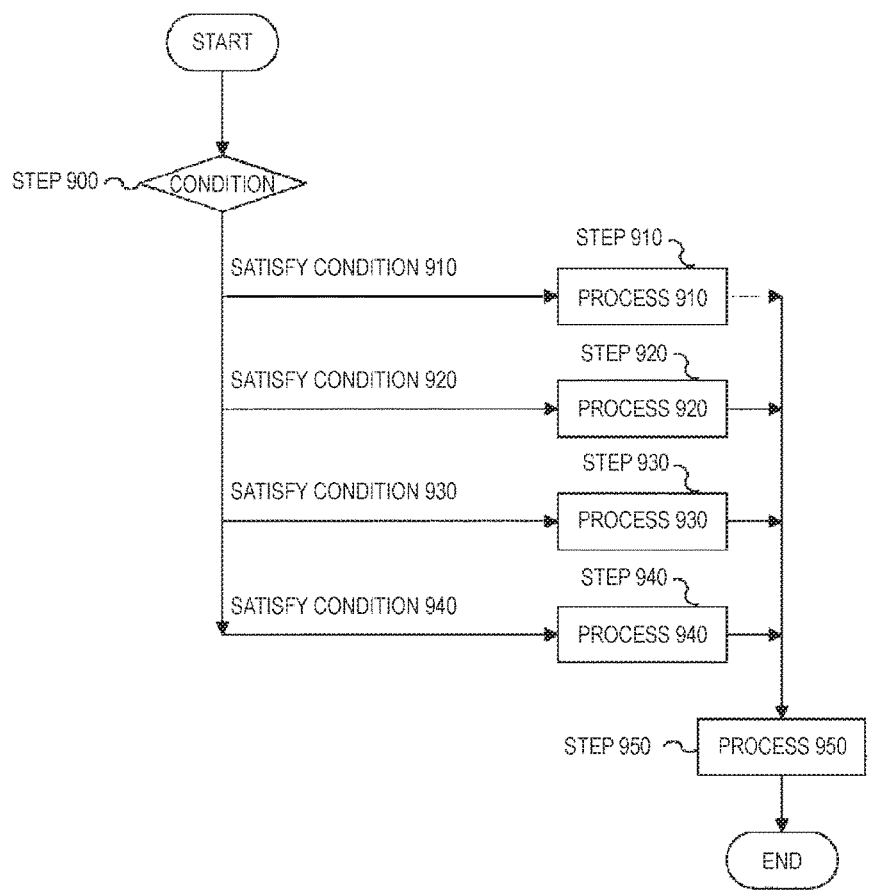
FIG. 9 is a diagram illustrating an example of a method of determining a DL reference UL/DL configuration according to the present embodiment.

FIG. 9 is a diagram illustrating one example of a method of determining a DL reference UL/DL configuration according to the present embodiment. Note that, the specific processes are not limited to the processes in FIG. 9 and the process may be changed by replacing, adding, or eliminating steps without departing from the spirit of the present invention. Furthermore, various modifications are possible for the process in FIG. 9 within the scope of the present invention defined by the claims, and embodiments that are made by suitably combining the technical means disclosed are also included in the technical scope of the present invention.

FIG. 9 includes step 900 to step 940. In step 900, it is determined which of a condition 910, a condition 920, a condition 930, and a condition 940 the terminal device 1 satisfies. Upon satisfying the condition 910, the terminal device 1 proceeds to step 910 and executes a process 910. Upon satisfying the condition 920, the terminal device 1 proceeds to step 920 and executes a process 920. Upon satisfying the condition 930, the terminal device 1 proceeds to step 930 and executes a process 930. Upon satisfying the condition 940, the terminal device 1 proceeds to step 940 and executes a process 940. After executing any of the processes 910 to 940, the terminal device 1 proceeds to step 950 and executes a process 950. After executing the process 950, the terminal device 1 ends the processes in FIG. 9.

For example, the condition 910, the condition 920, the condition 930, and/or the condition 940 may include at least a condition that, for scheduling of the serving cell, the terminal device 1 is not configured for monitoring the PDCCH/EPDCCH in another serving cell.

For example, the condition 910 includes the condition that: more than one serving cells are configured for the terminal device 1, at least two serving cells have different UL/DL configurations, and the serving cell is a primary cell.

For example, the condition 910 includes the condition that: a plurality of serving cells are configured for the terminal device 1, at least two serving cells have different UL/DL configurations, one primary PUCCH cell group and one secondary PUCCH cell group are configured for the terminal device 1, the terminal device 1 has the capability for simultaneous transmission and reception in an aggregated plurality of serving cells, and the serving cell is a PUCCH serving cell included in a secondary PUCCH cell group.

For example, in the process 910, the UL/DL configuration for the serving cell is the DL reference UL/DL configuration for the serving cell.

That is, upon more than one serving cells being configured for the terminal device 1, at least two serving cells having different UL/DL configurations, and the serving cell being a primary cell, the UL/DL configuration for the serving cell (primary cell) may be the DL reference UL/DL configuration for the serving cell (primary cell) (combination of the condition 910 and the process 910).

That is, upon a plurality of serving cells being configured for the terminal device 1, at least two serving cells having different UL/DL configurations, one primary PUCCH cell group and one secondary PUCCH cell group being configured for the terminal device 1, the terminal device 1 having the capability for simultaneous transmission and reception in an aggregated plurality of serving cells, and the serving cell being a PUCCH serving cell included in a secondary PUCCH cell group, the UL/DL configuration for the serving cell (PUCCH serving cell) may be the DL reference UL/DL configuration for the serving cell (PUCCH serving cell) (combination of the condition 910 and the process 910).

For example, the condition 920 includes the condition that: a plurality of serving cells are configured for the terminal device 1, at least two serving cells have different UL/DL configurations, one primary PUCCH cell group and one secondary PUCCH cell group are configured for the terminal device 1, the terminal device 1 has no capability for simultaneous transmission and reception in an aggregated plurality of serving cells, and the serving cell is a PUCCH serving cell included in a secondary PUCCH cell group.

For example, the condition 920 includes the condition that: a plurality of serving cells are configured for the terminal device 1, at least two serving cells have different UL/DL configurations, one primary PUCCH cell group and one secondary PUCCH cell group are configured for the terminal device 1, and the serving cell is a non-PUCCH secondary cell included in a primary PUCCH cell group.

For example, in the process 920, the DL reference UL/DL configuration for the serving cell is given by referring to a combination of the UL/DL configuration for the primary cell and the UL/DL configuration for the serving cell.

That is, upon a plurality of serving cells being configured for the terminal device 1, at least two serving cells having different UL/DL configurations, one primary PUCCH cell group and one secondary PUCCH cell group being configured for the terminal device 1, the terminal device 1 having no capability for simultaneous transmission and reception in an aggregated plurality of serving cells, and the serving cell being a PUCCH serving cell included in the secondary PUCCH cell group, the DL reference UL/DL configuration for the serving cell (the PUCCH serving cell included in the secondary PUCCH cell group) is given by referring to the combination of the UL/DL configuration for the primary cell and the UL/DL configuration for the serving cell (the PUCCH serving cell included in the secondary PUCCH cell group) (combination of the condition 920 and the process 920).

That is, upon a plurality of serving cells being configured for the terminal device 1, at least two serving cells having different UL/DL configurations, one primary PUCCH cell group and one secondary PUCCH cell group being configured for the terminal device 1, and the serving cell being a non-PUCCH secondary cell included in the primary PUCCH cell group, the DL reference UL/DL configuration for the serving cell (the non-PUCCH secondary cell included in the primary PUCCH cell group) is given by referring to a combination of the UL/DL configuration for the primary cell and the UL/DL configuration for the serving cell (the non-PUCCH secondary cell included in the primary PUCCH cell group) (combination of the condition 920 and the process 920).

For example, the condition 930 includes the condition that: a plurality of serving cells are configured for the terminal device 1, at least two serving cells have different UL/DL configurations, one primary PUCCH cell group and one secondary PUCCH cell group are configured for the terminal device 1, the terminal device 1 has the capability for simultaneous transmission and reception in an aggregated plurality of serving cells, and the serving cell is a non-PUCCH serving cell included in a secondary PUCCH cell group.

For example, in the process 930, the DL reference UL/DL configuration for the serving cell is given by referring to a combination of the UL/DL configuration for a PUCCH serving cell included in the secondary PUCCH cell group that includes the serving cell, and the UL/DL configuration for the serving cell.

That is, upon a plurality of serving cells being configured for the terminal device 1, at least two serving cells having different UL/DL configurations, one primary PUCCH cell group and one secondary PUCCH cell group being configured for the terminal device 1, the terminal device 1 having the capability for simultaneous transmission and reception in the aggregated plurality of serving cells, and the serving cell being a non-PUCCH serving cell included in the secondary PUCCH cell group, the DL reference UL/DL configuration for the serving cell (the non-PUCCH serving cell included in the secondary PUCCH cell group) is given by referring to a combination of the UL/DL configuration for the PUCCH serving cell included in the secondary PUCCH cell group that includes the serving cell (the non-PUCCH serving cell included in the secondary PUCCH cell group) and the UL/DL configuration for the serving cell (non-PUCCH serving cell included in the secondary PUCCH cell group).

For example, the condition 940 includes the condition that: a plurality of serving cells are configured for the terminal device 1, at least two serving cells have different UL/DL configurations, one primary PUCCH cell group and one secondary PUCCH cell group are configured for the terminal device 1, the terminal device 1 has no capability for simultaneous transmission and reception in an aggregated plurality of serving cells, and the serving cell is a non-PUCCH serving cell included in a secondary PUCCH cell group.

For example, in the process 940, the DL reference UL/DL configuration for the serving cell is given by referring to a combination of the UL/DL configuration for the primary cell, the UL/DL configuration for a PUCCH serving cell included in the secondary PUCCH cell group that includes the serving cell, and the UL/DL configuration for the serving cell.

That is, upon a plurality of serving cells being configured for the terminal device 1, at least two serving cells having different UL/DL configurations, one primary PUCCH cell group and one secondary PUCCH cell group being configured for the terminal device 1, the terminal device 1 having no capability for simultaneous transmission and reception in the aggregated plurality of serving cells, and the serving cell being a non-PUCCH serving cell included in the secondary PUCCH cell group, the DL reference UL/DL configuration for the serving cell (the non-PUCCH serving cell included in the secondary PUCCH cell group) is given by referring to a combination of the UL/DL configuration for the primary cell, the UL/DL configuration for the PUCCH serving cell included in the secondary PUCCH cell group that includes the serving cell (the non-PUCCH serving cell included in the secondary PUCCH cell group) and the UL/DL configuration for the serving cell (the non-PUCCH serving cell included in the secondary PUCCH cell group).

The process 950 may include a process to specify (select or determine) the downlink association set K by referring to the DL reference UL/DL configuration.

In FIG. 9, an example in which two PUCCH cell groups are configured for the terminal device 1 is described, but the present invention may also be applied to a case when more than two PUCCH cell groups are configured for the terminal device 1.

FIG. 10 is a first diagram illustrating a correspondence between a UL/DL configuration and a DL reference UL/DL configuration according to the present embodiment. In the process 920 and the process 930, the terminal device 1 specifies the DL reference UL/DL configuration for the serving cell on the basis of a table in FIG. 10. In the process 920, a first cell in FIG. 10 refers to a primary cell. In the process 930, the first cell in FIG. 10 refers to the PUCCH serving cell included in the secondary PUCCH cell group that includes the serving cell. For example, in FIG. 10, when the UL/DL configuration for the first cell is 1 and the UL/DL configuration for the serving cell is 3, the DL reference UL/DL configuration for the serving cell is 4.

FIG. 11 is a second diagram illustrating a correspondence between a UL/DL configuration and a DL reference UL/DL configuration according to the present embodiment. In the process 940, the terminal device 1 specifies the DL reference UL/DL configuration for the serving cell on the basis of a table in FIG. 11. In the process 940, the first cell in FIG. 11 refers to the primary cell, and the second cell in FIG. 11 refers to the PUCCH serving cell included in the secondary PUCCH cell group that includes the serving cell. For example, in FIG. 11, when the UL/DL configuration for the first cell is 3, the UL/DL configuration for the second cell is 1, and the UL/DL configuration for the serving cell is 2, the DL reference UL/DL configuration for the serving cell is 5.

The base station device 3 may specify the DL reference UL/DL configuration on the basis of the process in FIG. 9. The base station device 3 may specify the downlink association set K by referring to the specified DL reference UL/DL configuration. That is, by referring to the DL reference UL/DL configuration, the base station device 3 may specify the correspondence between the subframe n-k in which the PDSCH for a certain serving cell is allocated and the subframe n used to transmit the HARQ-ACK corresponding to the detection of the PDSCH.

A constitution of a device according to the present embodiment will be described below.

Figure 12:
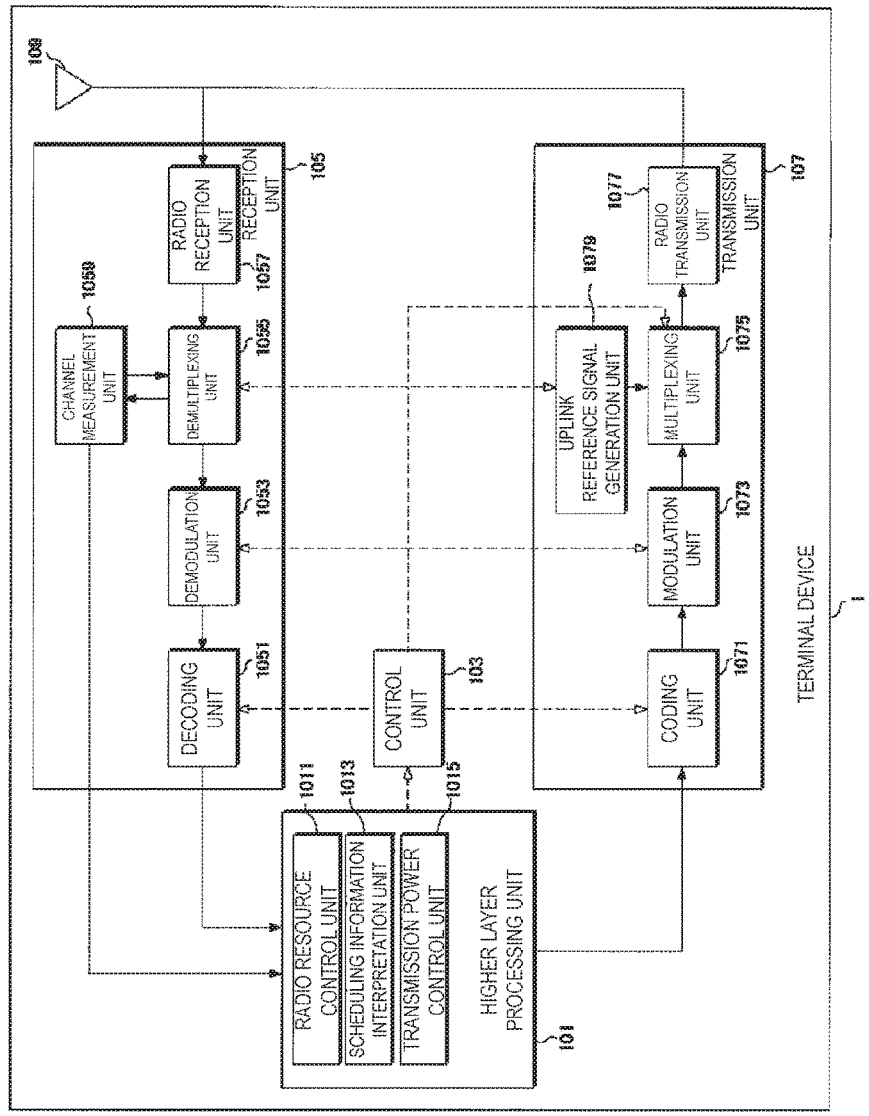
FIG. 12 is a schematic block diagram illustrating a constitution of a terminal device 1 according to the present embodiment.

FIG. 12 is a schematic block diagram illustrating a constitution of the terminal device 1 according to the present embodiment. As illustrated, the terminal device 1 is configured to include a higher layer processing unit 101, a control unit 103, a reception unit 105, a transmission unit 107, and a transmit and receive antenna unit 109. Furthermore, the higher layer processing unit 101 is configured to include a radio resource control unit 1011, a scheduling information interpretation unit 1013, and a transmission power control unit 1015. Furthermore, the reception unit 105 is configured to include a decoding unit 1051, a demodulation unit 1053, a demultiplexing unit 1055, a radio reception unit 1057, and a channel measurement unit 1059. Furthermore, the transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. Furthermore, the higher layer processing unit 101 performs processing of the medium access control (MAC) layer, a packet data convergence protocol (PDCP) layer, a radio link control (RLC) layer, and a radio resource control (RRC) layer.

The radio resource control unit 1011 included in the higher layer processing unit 101 manages various pieces of configuration information/parameters of the terminal device 1. The radio resource control unit 1011 sets the various pieces of configuration information/parameters on the basis of a higher layer signal received from the base station device 3. That is, the radio resource control unit 1011 sets the various pieces of configuration information/parameters on the basis of information indicating the various pieces of configuration information/parameters received from the base station device 3. Furthermore, the radio resource control unit 1011 generates information to be arranged in each channel of the uplink, and outputs the generated information to the transmission unit 107. The radio resource control unit 1011 is also referred to as a configuration unit 1011.

The scheduling information interpretation unit 1013 included in the higher layer processing unit 101 interprets the DCI format (scheduling information) received through the reception unit 105, generates control information for controlling of the reception unit 105 and the transmission unit 107, on the basis of a result of interpreting the DCI format, and outputs the generated control information to the control unit 103.

The transmission power control unit 1015 included in the higher layer processing unit 101 performs controlling of transmission power for transmission on the PUSCH and the PUCCH, on the basis of the various pieces of configuration information/parameters, a TPC command, and the like, managed by the radio resource control unit 1011.

The control unit 103 generates a control signal for controlling the reception unit 105 and the transmission unit 107 on the basis of the control information from the higher layer processing unit 101. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna unit 109, and outputs information resulting from the decoding to the higher layer processing unit 101.

The radio reception unit 1057 converts (down-converts) a downlink signal received through the transmit and receive antenna unit 109 into a baseband signal by orthogonal demodulation, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a cyclic prefix (CP) from the digital signal resulting from the conversion, performs fast Fourier transform (FTT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 performs compensation of channels including the PHICH, the PDCCH, the EPDCCH, and the PDSCH, from an estimated value of the channels input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a binary phase shift keying (BPSK) modulation scheme, and outputs a result of the demodulation to the decoding unit 1051. The decoding unit 1051 decodes the PHICH destined for the terminal device 1 and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of successful decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as quadrature phase shift keying (QPSK), 16 quadrature amplitude modulation (QAM), or 64 QAM, and outputs a result of the demodulation to the decoding unit 1051. The decoding unit 1051 decodes the data on the basis of information on a coding rate notified with the downlink control information, and outputs the downlink data (the transport block) resulting from the decoding, to the higher layer processing unit 101.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates an estimated value of a downlink channel from the downlink reference signal and outputs a calculation result to the demultiplexing unit 1055. The channel measurement unit 1059 performs channel measurement and/or interference measurement in order to calculate the CQI.

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and receive antenna unit 109.

The coding unit 1071 codes the uplink control information input from the higher layer processing unit 101 in compliance with a coding scheme, such as convolutional coding or block coding. Furthermore, the coding unit 1071 performs turbo coding on the basis of information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme prescribed in advance for each channel.

On the basis of the information used for the scheduling of the PUSCH, the modulation unit 1073 determines the number of data sequences to be spatial-multiplexed, maps a plurality of pieces of uplink data to be transmitted on the same PUSCH to a plurality of sequences through multiple input multiple output spatial multiplexing (MIMO SM), and performs precoding on the sequences.

The uplink reference signal generation unit 1079 generates a sequence acquired according to a rule (formula) prescribed in advance, on the basis of a physical layer cell identifier (also referred to as a physical layer cell identity (PCI), a cell ID, or the like) for identifying the base station device 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs discrete Fourier transform (DFT) on the rearranged modulation symbols. Furthermore, the multiplexing unit 1075 multiplexes PUCCH and PUSCH signals and the generated uplink reference signal for each transmit antenna port. To be more precise, the multiplexing unit 1075 maps the PUCCH and PUSCH signals and the generated uplink reference signal to the resource elements for each transmit antenna port.

The radio transmission unit 1077 performs inverse fast Fourier transform (IFFT) on a signal resulting from the multiplexing, generates an SC-FDMA symbol, attaches the CP to the generated SC-FDMA symbol, generates a baseband digital signal, converts the baseband digital signal into an analog signal, removes unnecessary frequency components by using a low-pass filter, up-converts the signal into a signal of carrier frequency, performs power amplification, and outputs a final result to the transmit and receive antenna unit 109 for transmission.

Figure 13:
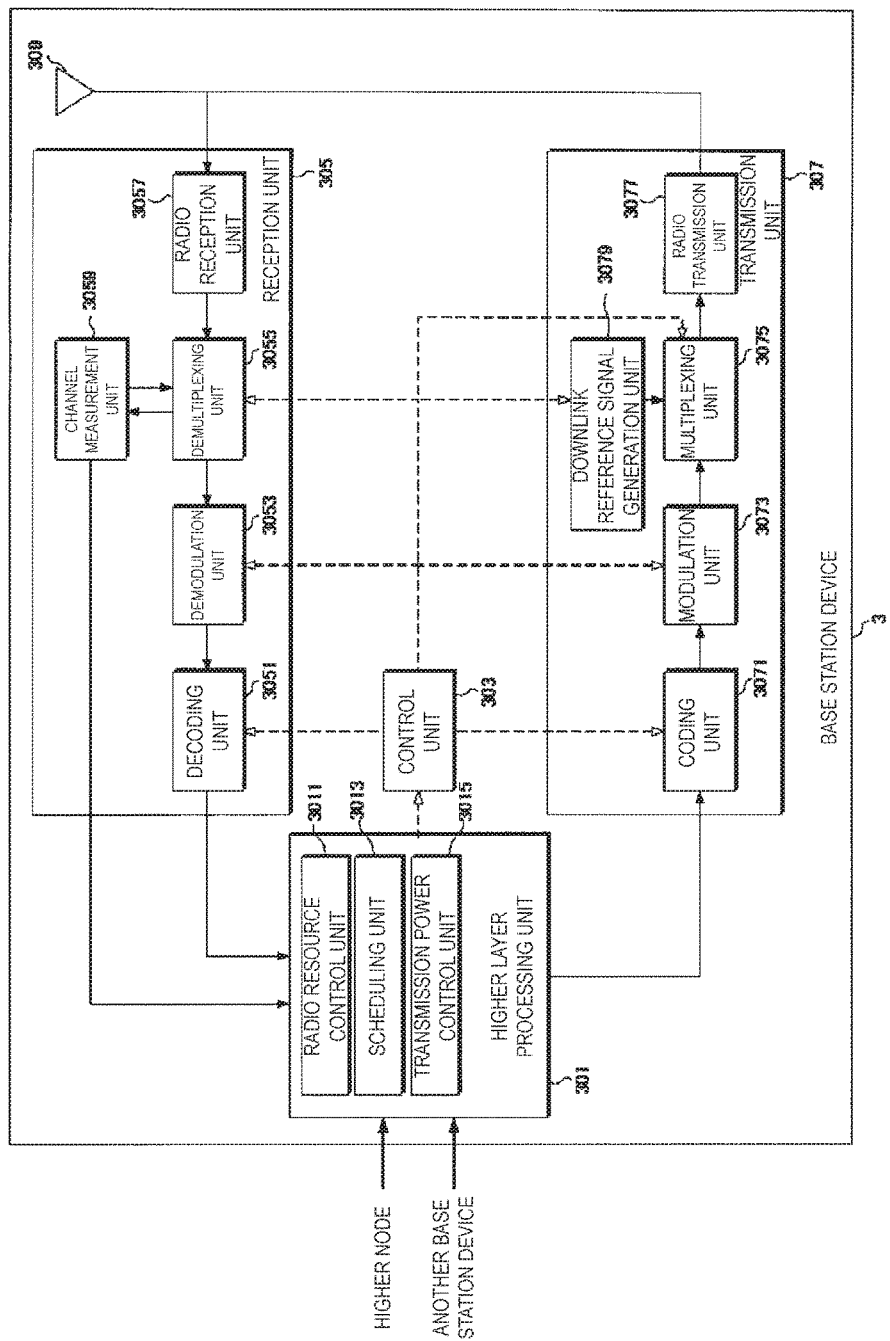
FIG. 13 is a schematic block diagram illustrating a constitution of a base station device 3 according to the present embodiment.

FIG. 13 is a schematic block diagram illustrating a constitution of the base station device 3 according to the present embodiment. As is illustrated, the base station device 3 is configured to include a higher layer processing unit 301, a control unit 303, a reception unit 305, a transmission unit 307, and a transmit and receive antenna unit 309. Furthermore, the higher layer processing unit 301 is configured to include a radio resource control unit 3011, a scheduling unit 3013, and a transmission power control unit 3015. Furthermore, the reception unit 305 is configured to include a decoding unit 3051, a demodulation unit 3053, a demultiplexing unit 3055, a radio reception unit 3057, and a channel measurement unit 3059. Furthermore, the transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. Furthermore, the higher layer processing unit 301 generates control information for controlling the reception unit 305 and the transmission unit 307, and outputs the generated control information to the control unit 303.

The radio resource control unit 3011 included in the higher layer processing unit 301 generates, or acquires from a higher node, downlink data (transport block) arranged in the downlink PDSCH, system information, the RRC message, the MAC control element (CE), and the like, and outputs a result of the generation or the acquirement to the transmission unit 307. Furthermore, the radio resource control unit 3011 manages various pieces of configuration information/parameters for each of the terminal devices 1. The radio resource control unit 3011 may set various pieces of configuration information/parameters for each of the terminal devices 1 via a higher layer signal. That is, the radio resource control unit 1011 transmits/broadcasts information indicating various pieces of configuration information/parameters. The radio resource control unit 3011 is also referred to as a configuration unit 3011.

The scheduling unit 3013 included in the higher layer processing unit 301 determines a frequency and a subframe to which the physical channels (the PDSCH and the PUSCH) are allocated, the coding rate and modulation scheme for the physical channels (the PDSCH and the PUSCH), the transmission power, and the like, from the received channel state information and from the estimated value of the channel, the channel quality, or the like input from the channel measurement unit 3059. On the basis of a result of the scheduling, the scheduling unit 3013 generates control information (for example, the DCI format) for controlling the reception unit 305 and the transmission unit 307, and outputs the generated information to the control unit 303. The scheduling unit 3013 further determines a timing for performing the transmission procedure and the reception procedure.

The transmission power control unit 3015 included in the higher layer processing unit 301 performs controlling of transmission power for transmission by the terminal device 1 on the PUSCH and the PUCCH, through the various pieces of configuration information/parameters, the TPC command, and the like, managed by the radio resource control unit 3011.

On the basis of the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and receive antenna unit 309, and outputs information resulting from the decoding to the higher layer processing unit 301. The radio reception unit 3057 converts (down-converts) an uplink signal received through the transmit and receive antenna unit 309 into a baseband signal by orthogonal demodulation, removes unnecessary frequency components, controls an amplification level in such a manner as to suitably maintain a signal level, performs orthogonal demodulation on the basis of an in-phase component and an orthogonal component of the received signal, and converts the analog signal resulting from the orthogonal demodulation into a digital signal.

The radio reception unit 3057 removes a portion corresponding to the cyclic prefix (CP) from the digital signal resulting from the conversion. The radio reception unit 3057 performs fast Fourier transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. Note that, the demultiplexing is performed on the basis of radio resource allocation information that is determined in advance by the base station device 3 using the radio resource control unit 3011 and that is included in the uplink grant notified to each of the terminal devices 1. Furthermore, the demultiplexing unit 3055 performs compensation of channels including the PUCCH and the PUSCH, from an estimated value of the channels input from the channel measurement unit 3059. Furthermore, the demultiplexing unit 3055 outputs an uplink reference signal resulting from the demultiplexing, to the channel measurement unit 3059.

The demodulation unit 3053 performs inverse discrete Fourier transform (IDFT) on the PUSCH, acquires the modulation symbol, and performs reception signal demodulation on each of the modulation symbols of the PUCCH and the PUSCH, in compliance with the modulation scheme prescribed in advance, such as binary phase shift keying (BPSK), QPSK, 16 QAM, or 64 QAM, or in compliance with the modulation scheme that the base station device 3 notifies in advance with the uplink grant to each of the terminal devices 1. The demodulation unit 3053 demultiplexes the modulation symbols of the plurality of pieces of uplink data transmitted on the same PUSCH by using the MIMO SM, on the basis of the number of spatial-multiplexed sequences notified in advance with the uplink grant to each of the terminal devices 1 and information indicating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the terminal device 1 by the base station device 3, and outputs the decoded uplink data and uplink control information to the higher layer processing unit 101. In a case where the PUSCH is re-transmitted, the decoding unit 3051 performs the decoding using the coded bits input from the higher layer processing unit 301 and retained in an HARQ buffer, and the demodulated coded bits. The channel measurement unit 309 measures the channel estimate, the channel quality, and the like, on the basis of the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data input from the higher layer processing unit 301, multiplexes the PHICH, the PDCCH, the EPDCCH, the PDSCH, and the downlink reference signal, and transmits the resulting signal to the terminal device 1 through the transmit and receive antenna unit 309.

The coding unit 3071 codes the HARQ indicator, the downlink control information, and the downlink data input from the higher layer processing unit 301, in compliance with the coding scheme prescribed in advance, such as block coding, convolutional coding, or turbo coding, or in compliance with a coding scheme determined by the radio resource control unit 3011. The modulation unit 3073 modulates the coded bits input from the coding unit 3071, in compliance with the modulation scheme prescribed in advance, such as BPSK, QPSK, 16 QAM, or 64 QAM, or in compliance with a modulation scheme determined by the radio resource control unit 3011.

The downlink reference signal generation unit 3079 generates, as the downlink reference signal, a sequence that is already known to the terminal device 1 and that is acquired according to a rule prescribed in advance on the basis of the physical layer cell identifier (PCI) for identifying the base station device 3, and the like. The multiplexing unit 3075 multiplexes the modulated modulation symbol of each channel and the generated downlink reference signal. To be more precise, the multiplexing unit 3075 arranges the modulated modulation symbol of each channel and the generated downlink reference signal to the resource elements.

The radio transmission unit 3077 performs inverse fast Fourier transform (IFFT) on the modulation symbol resulting from the multiplexing or the like, generates an OFDM symbol, attaches the CP to the generated OFDM symbol, generates a baseband digital signal, converts the baseband digital signal into an analog signal, removes unnecessary frequency components by using a low-pass filter, up-converts the signal into a signal of carrier frequency, performs power amplification, and outputs a final result to the transmit and receive antenna unit 309 for transmission.

(1) In an aspect (A) of the present embodiment, the terminal device 1 communicates with a base station device by using one primary cell included in a first group (a primary PUCCH cell group) and one special secondary cell that is a secondary cell having an uplink component carrier, configured with a physical uplink control channel resource, and included in a second group (a secondary PUCCH cell group). The terminal device 1 may include: a reception unit configured to receive first information indicating a first uplink/downlink configuration for the primary cell, and an uplink/downlink indicating a second uplink-downlink configuration for the special secondary cell; and a transmission unit configured to transmit a HARQ-ACK in a subframe m by using a physical uplink control channel of the primary cell, on the basis of detection of transmission of a physical downlink shared channel in a subframe m-j for the primary cell, and configured to transmit a HARQ-ACK in a subframe n by using a physical uplink control channel of the special secondary cell, on the basis of detection of transmission of a physical downlink shared channel in a subframe n-k for the special secondary cell.

(2) In the aspect (A) of the present embodiment, the base station device 3 communicates with a terminal device by using one primary cell included in a first group (a primary PUCCH cell group) and one special secondary cell that is a secondary cell having an uplink component carrier, configured with a physical uplink control channel resource, and included in a second group (a secondary PUCCH cell group). The base station device 3 may include: a transmission unit configured to transmit first information indicating a first uplink/downlink configuration for the primary cell, and second information indicating a second uplink/downlink configuration for the special secondary cell; and a reception unit configured to receive a HARQ-ACK in a subframe m by using a physical uplink control channel of the primary cell, the HARQ-ACK being transmitted on the basis of detection of transmission of a physical downlink shared channel in a subframe m-j for the primary cell, and configured to receive a HARQ-ACK in a subframe n by using a physical uplink control channel of the special secondary cell, the HARQ-ACK being transmitted on the basis of detection of transmission of a physical downlink shared channel in a subframe n-k for the special secondary cell.

(3) In the aspect (A) of the present embodiment, the reception unit included in the base station device may receive, from the terminal device, information indicating whether or not the terminal device has a capability of performing simultaneous transmission and reception in the primary cell and the special secondary cell.

(4) In the aspect (A) of the present embodiment, the j may be given by referring to the first uplink/downlink configuration indicated by the first information. Upon the terminal device having the capability of performing simultaneous transmission and reception in the primary cell and the special secondary cell, the k may be given by referring to the second uplink/downlink configuration indicated by the second information. Upon the terminal device not having the capability of performing simultaneous transmission and reception in the primary cell and the special secondary cell, and upon the first uplink/downlink configuration indicated by the first information being different from the second uplink/downlink configuration indicated by the second information, the k may be given by referring to the first uplink/downlink configuration indicated by the first information and the second uplink/downlink configuration indicated by the second information.

(5) In the aspect (A) of the present embodiment, upon the first uplink/downlink configuration indicated by the first information being different from the second uplink/downlink configuration indicated by the second information, the j may be given by referring to a downlink reference uplink/downlink configuration for the primary cell, the k may be given by referring to a downlink reference uplink/downlink configuration for the special secondary cell, and a downlink reference uplink/downlink configuration for the primary cell is the first uplink/downlink configuration indicated by the first information. Upon the terminal device having the capability of performing simultaneous transmission and reception in the primary cell and the special secondary cell, the downlink reference uplink/downlink configuration is the second uplink/downlink configuration indicated by the second information, and upon the terminal device not having the capability of performing simultaneous transmission and reception in the primary cell and the special secondary cell, the downlink reference uplink/downlink configuration may be given by referring to the first uplink/downlink configuration indicated by the first information and the second uplink/downlink configuration indicated by the second information.

(6) In the aspect (A) of the present embodiment, upon the terminal device not having the capability of performing simultaneous transmission and reception in the primary cell and the special secondary cell, and an uplink/downlink configuration indicated by the first information and an uplink/downlink configuration indicated by the second information being the same, the k may be given by referring to the uplink/downlink configuration indicated by the second information.

(7) In the aspect (A) of the present embodiment, whether the terminal device has the capability of performing simultaneous transmission and reception in the primary cell and the special secondary cell, may be based on a combination of a band to which the primary cell belongs and a band to which the special secondary cell belongs.

(8) In the aspect (A) of the present embodiment, the first group may include only the one primary cell and the second group may include only the one special secondary cell and the one non-special secondary cell.

(9) In an aspect (B) of the present embodiment, the terminal device 1 communicates with a base station device by using three serving cells, including: one primary cell included in a first group (a primary PUCCH cell group), one special secondary cell that is a secondary cell having an uplink component carrier, configured with a physical uplink control channel resource, and included in a second group (a secondary PUCCH cell group), and one non-special secondary cell that is a secondary cell included in the second group (the secondary PUCCH cell group). The terminal device 1 may include: a reception unit configured to receive first information indicating a first uplink/downlink configuration for the primary cell, second information indicating a second uplink/downlink configuration for the special secondary cell, and third information indicating a third uplink/downlink configuration for the non-special secondary cell; and a transmission unit configured to transmit a HARQ-ACK in a subframe m by using a physical uplink control channel of the primary cell, on the basis of detection of transmission of a physical downlink shared channel in a subframe m-j for the primary cell, and configured to transmit a HARQ-ACK in a subframe i by using a physical uplink control channel of the special secondary cell, on the basis of detection of transmission of a physical downlink shared channel in a subframe i-p for the non-special secondary cell.

(10) In the aspect (B) of the present embodiment, the base station device 3 communicates with a terminal device by using three serving cells, including: one primary cell included in a first group (a primary PUCCH cell group), one special secondary cell that is a secondary cell having an uplink component carrier, configured with a physical uplink control channel resource, and included in a second group (a secondary PUCCH cell group), and one non-special secondary cell that is a secondary cell included in the second group (the secondary PUCCH cell group). The base station device 3 may include: a transmission unit configured to transmit first information indicating a first uplink/downlink configuration for the primary cell, second information indicating a second uplink/downlink configuration for the special secondary cell, and third information indicating a third uplink/downlink configuration for the non-special secondary cell; and a reception unit configured to receive a HARQ-ACK in a subframe m by using a physical uplink control channel of the primary cell, the HARQ-ACK being transmitted on the basis of detection of transmission of a physical downlink shared channel in a subframe m-j for the primary cell, and configured to receive a HARQ-ACK in a subframe i by using a physical uplink control channel of the special secondary cell, the HARQ-ACK being transmitted on the basis of detection of transmission of a physical downlink shared channel in a subframe i-p for the non-special secondary cell.

(11) in the aspect (B) of the present embodiment, the reception unit included in the base station device may receive, from the terminal device, information indicating whether or not the terminal device has a capability of performing simultaneous transmission and reception in the three serving cells.

(2) In the aspect (B) of the present embodiment, the j may be given by referring to the first uplink/downlink configuration indicated by the first information. Upon the terminal device not having the capability of performing simultaneous transmission and reception in the three serving cells, and upon the second uplink/downlink configuration indicated by the second information being different from the third uplink/downlink configuration indicated by the third information, the p may be given by referring to the first uplink/downlink configuration indicated by the first information, the second uplink/downlink configuration indicated by the second information, and the third uplink/downlink configuration indicated by the third information.

(13) In the aspect (B) of the present embodiment, upon the terminal device not having the capability of performing simultaneous transmission and reception in the three serving cells, and the first uplink/downlink configuration indicated by the first information, the second uplink/downlink configuration indicated by the second information, and the third uplink/downlink configuration indicated by the third information being all the same, the p may be given by referring to the third uplink/downlink configuration indicated by the third information.

(14) In the aspect (B) of the present embodiment, upon the terminal device having the capability of performing simultaneous transmission and reception in the three serving cells, and the second uplink/downlink configuration indicated by the second information being different from the third uplink/downlink configuration indicated by the third information, the p may be given by referring to the second uplink/downlink configuration indicated by the second information and the third uplink/downlink configuration indicated by the third information.

(15) In the aspect (B) of the present embodiment, upon the terminal device having the capability of performing simultaneous transmission and reception in the three serving cells, and the second uplink/downlink configuration indicated by the second information and the third uplink/downlink configuration indicated by the third information being the same, the p may be given by referring to the third uplink/downlink configuration indicated by the third information.

(16) In the aspect (B) of the present embodiment, upon the terminal device not having the capability of performing simultaneous transmission and reception in the three serving cells, and the second uplink/downlink configuration indicated by the second information and the third uplink/downlink configuration indicated by the third information being the same, the p may be given by referring to the first uplink/downlink configuration indicated by the first information and the third uplink/downlink configuration indicated by the third information.

(17) In the aspect (B) of the present embodiment, upon the terminal device not having the capability of performing simultaneous transmission and reception in the three serving cells, and the second uplink/downlink configuration indicated by the second information and the third uplink/downlink configuration indicated by the third information being the same, and the first uplink/downlink configuration indicated by the first information being different from the third uplink/downlink configuration indicated by the third information, the p may be given by referring to the first uplink/downlink configuration indicated by the first information and the third uplink/downlink configuration indicated by the third information.

(18) In the aspect (B) of the present embodiment, whether the terminal device has the capability of performing simultaneous transmission and reception in the three serving cells, may be based on a combination of a first band to which the primary cell belongs, a second band to which the special secondary cell belongs, and a third band to which the non-special secondary cell belongs.

(19) In the aspect (B) of the present embodiment, whether the terminal device has the capability of performing simultaneous transmission and reception in the three serving cells, may be based on a combination of a fourth band to which two of the three serving cells belong, and a fifth band to which the remaining one serving cell of the three serving cells belongs.

(20) In the aspect (B) of the present embodiment, the first group may include only the one primary cell and the second group may include only the one special secondary cell and the one non-special secondary cell.

Thereby, a terminal device is capable of efficiently executing a transmission procedure of a physical uplink control channel in a serving cell other than a primary cell. Furthermore, a base station device is capable of efficiently executing a reception procedure of a physical uplink control channel in a serving cell other than a primary cell.

A program running on each of the base station device 3 and the terminal device 1 according to the present invention may be a program that controls a central processing unit (CPU) and the like (a program for causing a computer to operate) in such a manner as to realize the functions according to the above-described embodiment of the present invention. The information handled in these devices is temporarily stored in a random access memory (RAM) while being processed. Thereafter, the information is stored in various types of read only memory (ROM) such as a flash ROM and a hard disk drive (HDD) and if necessary, is read by the CPU to be modified or rewritten.

Note that, the terminal device 1 and the base station device 3 according to the above-described embodiment may be partially realized by the computer. This configuration may be realized by recording a program for realizing such control functions on a computer-readable recording medium and causing a computer system to read the program recorded on the recording medium for execution.

Note that, the "computer system" here is defined as a computer system built into the terminal device 1 or the base station device 3, and the computer system includes an OS and hardware components such as a peripheral device.

Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the above-described program may be configured to realize some of the functions described above, and additionally may be configured to be capable of realizing the functions described above in combination with a program already recorded in the computer system.

Furthermore, the base station device 3 according to the above-described embodiment can be realized as an aggregation (a device group) constituted of a plurality of devices. Devices constituting the device group may be each equipped with some or all portions of each function or each functional block of the base station device 3 according to the above-described embodiment. It is only required that the device group itself include general functions or general functional blocks of the base station device 3. Furthermore, the terminal device 1 according to the above-described embodiment can also communicate with a base station device as the aggregation.

Furthermore, the base station device 3 according to the above-described embodiment may be an evolved universal terrestrial radio access network (EUTRAN). Furthermore, the base station device 3 according to the above-described embodiment may have some or all functions of a node higher than an eNodeB.

Furthermore, sonic or all portions of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, a circuit integration technique is not limited to the LSI, and the integrated circuit may be realized with a dedicated circuit or a general-purpose processor. Furthermore, if with advances in semiconductor technology, a circuit integration technology with which the LSI is replaced appears, it is also possible to use an integrated circuit based on the technology.

Furthermore, according to the above-described embodiment, the terminal device is described as one example of a communication device, but the present invention is not limited to this, and can be applied to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

An embodiment of the present invention has been described in detail above with reference to the drawings, but the specific configuration is not limited to the embodiment and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

INDUSTRIAL APPLICABILITY

Some aspects of the present invention can be applied to a terminal device, a base station device, an integrated circuit, a communication method, and the like, requiring efficient communication between the terminal device and the base station device by using a physical uplink control channel in a serving cell other than a primary cell.

DESCRIPTION OF REFERENCE NUMERALS 1 (1A, 1B, 1C) Terminal device
3 Base station device
101 Higher layer processing unit
103 Control unit
105 Reception unit 107 Transmission unit
301 Higher layer processing unit
303 Control unit
305 Reception unit
307 Transmission unit
1011 Radio resource control unit
1013 Scheduling information interpretation unit
1015 Transmission power control unit
3011 Radio resource control unit
3013 Scheduling unit
3015 Transmission power control unit

The invention claimed is:

1. A terminal device configured to communicate with a base station device by using one primary cell included in a first group and one special secondary cell that is a secondary cell having an uplink component carrier, configured with a physical uplink control channel resource, and included in a second group, the terminal device comprising:
a reception unit configured to receive first information indicating a first uplink/downlink configuration for the primary cell, and second information indicating a second uplink/downlink configuration for the special secondary cell; and
a transmission unit configured to transmit a HARQ-ACK in a subframe m by using a physical uplink control channel of the primary cell, on the basis of detection of transmission of a physical downlink shared channel in a subframe m-j for the primary cell, and to transmit a HARQ-ACK in a subframe n by using a physical uplink control channel of the special secondary cell, on the basis of detection of transmission of a physical downlink shared channel in a subframe n-k for the special secondary cell,
the j being given by referring to the first uplink/downlink configuration indicated by the first information,
the k being given by referring to the second uplink/downlink configuration indicated by the second information upon the terminal device having a capability of performing simultaneous transmission and reception in the primary cell and the special secondary cell, and
the k being given by referring to the first uplink/downlink configuration indicated by the first information and the second uplink/downlink configuration indicated by the second information upon the terminal device not having the capability of performing simultaneous transmission and reception in the primary cell and the special secondary cell and upon the first uplink/downlink configuration indicated by the first information being different from the second uplink/downlink configuration indicated by the second information.

2. The terminal device according to claim 1, wherein the k is given by referring to the second uplink/downlink configuration indicated by the second information upon the terminal device not having the capability of performing simultaneous transmission and reception in the primary cell and the special secondary cell and upon the first uplink/downlink configuration indicated by the first information and the second uplink/downlink configuration indicated by the second information being the same.

3. The terminal device according to claim 1, wherein whether the terminal device has the capability of performing simultaneous transmission and reception in the primary cell and the special secondary cell, is based on a combination of a band to which the primary cell belongs and a band to which the special secondary cell belongs.

4. The terminal device according to claim 1, wherein the first group includes only the one primary cell and the second group includes only the one special secondary cell.

5. An integrated circuit mounted in a terminal device configured to communicate with a base station device by using one primary cell included in a first group and one special secondary cell that is a secondary cell having an uplink component carrier, configured with a physical uplink control channel resource, and included in a second group, the integrated circuit causing the terminal device to fulfill a series of functions of:
receiving first information indicating a first uplink/downlink configuration for the primary cell, and second information indicating a second uplink/downlink configuration for the special secondary cell;
transmitting a HARQ-ACK in a subframe m by using a physical uplink control channel of the primary cell, on the basis of detection of transmission of a physical downlink shared channel in a subframe m-j for the primary cell; and
transmitting a HARQ-ACK in a subframe n by using a physical uplink control channel of the special secondary cell, on the basis of detection of transmission of a physical downlink shared channel in a subframe n-k for the special secondary cell,
the j being given by referring to the first uplink/downlink configuration indicated by the first information,
the k being given by referring to the second uplink/downlink configuration indicated by the second information upon the terminal device having a capability of performing simultaneous transmission and reception in the primary cell and the special secondary cell, and
the k being given by referring to the first uplink/downlink configuration indicated by the first information and the second uplink/downlink configuration indicated by the second information upon the terminal device not having the capability of performing simultaneous transmission and reception in the primary cell and the special secondary cell and upon the first uplink/downlink configuration indicated by the first information being different from the second uplink/downlink configuration indicated by the second information.

6. A communication method used in a terminal device configured to communicate with a base station device by using one primary cell included in a first group and one special secondary cell that is a secondary cell having an uplink component carrier, configured with a physical uplink control channel resource, and included in a second group, the method comprising the steps of:
receiving first information indicating a first uplink/downlink configuration for the primary cell, and second information indicating a second uplink/downlink configuration for the special secondary cell;
transmitting a HARQ-ACK in a subframe m by using a physical uplink control channel of the primary cell, on the basis of detection of transmission of a physical downlink shared channel in a subframe m-j for the primary cell; and
transmitting a HARQ-ACK in a subframe n by using a physical uplink control channel of the special secondary cell, on the basis of detection of transmission of a physical downlink shared channel in a subframe n-k for the special secondary cell,
the j being given by referring to the first uplink/downlink configuration indicated by the first information,
the k being given by referring to the second uplink/downlink configuration indicated by the second information upon the terminal device having a capability of performing simultaneous transmission and reception in the primary cell and the special secondary cell, and the k being given by referring to the first uplink/downlink configuration indicated by the first information and the second uplink/downlink configuration indicated by the second information upon the terminal device not having the capability of performing simultaneous transmission and reception in the primary cell and the special secondary cell and upon the first uplink/downlink configuration indicated by the first information being different from the second uplink/downlink configuration indicated by the second information.

7. A base station device configured to communicate with a terminal device by using one primary cell included in a first group and one special secondary cell that is a secondary cell having an uplink component carrier, configured with a physical uplink control channel resource, and included in a second group, the base station device comprising:
  a transmission unit configured to transmit first information indicating a first uplink/downlink configuration for the primary cell, and second information indicating a second uplink/downlink configuration for the special secondary cell; and
  a reception unit configured to receive a HARQ-ACK in a subframe m by using a physical uplink control channel of the primary cell, the HARQ-ACK being transmitted on the basis of detection of transmission of a physical downlink shared channel in a subframe m-j for the primary cell, and to receive a HARQ-ACK in a subframe n by using a physical uplink control channel of the special secondary cell, the HARQ-ACK being transmitted on the basis of detection of transmission of a physical downlink shared channel in a subframe n-k for the special secondary cell,
  the j being given by referring to the first uplink/downlink configuration indicated by the first information,
  the k being given by referring to the second uplink/downlink configuration indicated by the second information upon the terminal device having a capability of performing simultaneous transmission and reception in the primary cell and the special secondary cell, and
  the k being given by referring to the first uplink/downlink configuration indicated by the first information and the second uplink/downlink configuration indicated by the second information upon the terminal device not having the capability of performing simultaneous transmission and reception in the primary cell and the special secondary cell and upon the first uplink/downlink configuration indicated by the first information being different from the second uplink/downlink configuration indicated by the second information.

8. The base station device according to claim 7, wherein the reception unit receives, from the terminal device, information indicating whether or not the terminal device has the capability of performing simultaneous transmission and reception in the primary cell and the special secondary cell.

9. The base station device according to claim 7, wherein the k is given by referring to the second uplink/downlink configuration indicated by the second information upon the terminal device not having the capability of performing simultaneous transmission and reception in the primary cell and the special secondary cell and upon the first uplink/downlink configuration indicated by the first information and the second uplink/downlink configuration indicated by the second information being the same.

10. The base station device according to claim 7, wherein whether the terminal device has the capability of performing simultaneous transmission and reception in the primary cell and the special secondary cell, is based on a combination of a band to which the primary cell belongs and a band to which the special secondary cell belongs.

11. The base station device according to claim 7, wherein the first group includes only the one primary cell and the second group includes only the one special secondary cell.

12. An integrated circuit mounted in a base station device configured to communicate with a terminal device by using one primary cell included in a first group and one special secondary cell that is a secondary cell having an uplink component carrier, configured with a physical uplink control channel resource, and included in a second group, the integrated circuit causing the base station device to fulfill a series of functions of:
  transmitting first information indicating a first uplink/downlink configuration for the primary cell, and second information indicating a second uplink/downlink configuration for the special secondary cell;
  receiving a HARQ-ACK in a subframe m by using a physical uplink control channel of the primary cell, the HARQ-ACK being transmitted on the basis of detection of transmission of a physical downlink shared channel in a subframe for the primary cell; and
  receiving a HARQ-ACK in a subframe n by using a physical uplink control channel of the special secondary cell, the HARQ-ACK being transmitted on the basis of detection of transmission of a physical downlink shared channel in a subframe n-k for the special secondary cell,
  the j being given by referring to the first uplink/downlink configuration indicated by the first information,
  the k being given by referring to the second uplink/downlink configuration indicated by the second information upon the terminal device having a capability of performing simultaneous transmission and reception in the primary cell and the special secondary cell, and
  the k being given by referring to the first uplink/downlink configuration indicated by the first information and the second uplink/downlink configuration indicated by the second information upon the terminal device not having the capability of performing simultaneous transmission and reception in the primary cell and the special secondary cell and upon the first uplink/downlink configuration indicated by the first information being different from the second uplink/downlink configuration indicated by the second information.

13. A communication method used in a base station device configured to communicate with a terminal device by using one primary cell included in a first group and one special secondary cell that is a secondary cell having an uplink component carrier, configured with a physical uplink control channel resource, and included in a second group, the method comprising the steps of:
  transmitting first information indicating a first uplink/downlink configuration for the primary cell, and second information indicating a second uplink/downlink configuration for the special secondary cell;
  receiving a HARQ-ACK in a subframe m by using a physical uplink control channel of the primary cell, the HARQ-ACK being transmitted on the basis of detection of transmission of a physical downlink shared channel in a subframe m-j for the primary cell; and
  receiving a HARQ-ACK in a subframe n by using a physical uplink control channel of the special secondary cell, the HARQ-ACK being transmitted on the basis of detection of transmission of a physical downlink shared channel in a subframe n-k for the special secondary cell, the j being given by referring to the first uplink/downlink configuration indicated by the first information.

the k being given by referring to the second uplink/downlink configuration indicated by the second information upon the terminal device having a capability of performing simultaneous transmission and reception in the primary cell and the special secondary cell, and the k being given by referring to the first uplink/downlink configuration indicated by the first information and the second uplink/downlink configuration indicated by the second information upon the terminal device not having the capability of performing simultaneous transmission and reception in the primary cell and the special secondary cell and upon the first uplink/downlink configuration indicated by the first information being different from the second uplink/downlink configuration indicated by the second information.

* * * * *